United States Patent
Li et al.

(10) Patent No.: US 11,162,461 B2
(45) Date of Patent: Nov. 2, 2021

(54) TEMPERATURE CONTROL THROTTLE DEVICE FOR AN ENGINE

(71) Applicant: Tao Li, Shanghai (CN)

(72) Inventors: Tao Li, Shanghai (CN); Lishi Zhang, Shanghai (CN)

(73) Assignee: Tao Li, Shanghai (CN)

( * ) Notice: Subject to any disclaimer, the term of this patent is extended or adjusted under 35 U.S.C. 154(b) by 0 days.

(21) Appl. No.: 16/295,880

(22) Filed: Mar. 7, 2019

(65) Prior Publication Data

US 2019/0285030 A1   Sep. 19, 2019

(30) Foreign Application Priority Data

Mar. 14, 2018 (CN) .......................... 201810208318.7
Aug. 20, 2018 (CN) .......................... 201810947753.1

(51) Int. Cl.
| | |
|---|---|
| *F02M 31/10* | (2006.01) |
| *F02D 9/10* | (2006.01) |
| *F02M 31/083* | (2006.01) |
| *F02M 35/10* | (2006.01) |
| *F02M 31/04* | (2006.01) |
| *F02D 41/00* | (2006.01) |
| *F02M 31/087* | (2006.01) |
| *F02M 31/06* | (2006.01) |
| *F02M 31/093* | (2006.01) |

(52) U.S. Cl.
CPC .......... *F02M 31/10* (2013.01); *F02D 9/1035* (2013.01); *F02D 41/0002* (2013.01); *F02M 31/042* (2013.01); *F02M 31/068* (2013.01); *F02M 31/083* (2013.01); *F02M 31/087* (2013.01); *F02M 31/107* (2013.01); *F02M 35/10255* (2013.01); *F02M 35/10268* (2013.01); *F02D 2200/0404* (2013.01); *F02D 2200/0414* (2013.01); *F02M 31/093* (2013.01)

(58) Field of Classification Search
CPC ............... F02D 41/0002; F02D 9/1035; F02D 2200/0404; F02D 2200/0414; F02M 31/042; F02M 31/068; F02M 31/083; F02M 31/087; F02M 31/10; F02M 31/107; F02M 35/10255; F02M 35/10268; F02M 31/093
See application file for complete search history.

(56) References Cited

U.S. PATENT DOCUMENTS

| | | |
|---|---|---|
| 3,444,848 A | 5/1969 | Lawrence |
| 8,539,932 B2 | 9/2013 | Ramappan et al. |
| (Continued) | | |

FOREIGN PATENT DOCUMENTS

| | | |
|---|---|---|
| CN | 101432509 A | 5/2009 |
| CN | 103987943 A | 8/2014 |
| (Continued) | | |

*Primary Examiner* — Brandon D Lee
(74) *Attorney, Agent, or Firm* — Novick, Kim & Lee, PLLC; Sang Ho Lee; Hyun Woo Shin

(57) ABSTRACT

A temperature control throttle device is provided. The temperature control throttle device includes: at least one throttle; a first pipeline and a second pipeline, wherein, the first pipeline and the second pipeline are connected to the same side of the at least one throttle in an air flow direction in parallel, and wherein the second pipeline is provided with a heat exchanger that heats air flowing through the second pipeline with engine coolant, engine oil or engine exhaust gas as a heat source.

8 Claims, 15 Drawing Sheets

(56) References Cited

U.S. PATENT DOCUMENTS

| | | | |
|---|---|---|---|
| 2009/0260587 A1* | 10/2009 | Albert | F16K 31/53 |
| | | | 123/41.52 |
| 2009/0320808 A1 | 12/2009 | Albert et al. | |
| 2011/0061625 A1 | 3/2011 | Joergl et al. | |
| 2011/0132317 A1 | 6/2011 | Ramappan et al. | |
| 2014/0345566 A1 | 11/2014 | Lallemant et al. | |
| 2015/0034192 A1 | 2/2015 | Hossfeld et al. | |
| 2015/0275828 A1 | 10/2015 | Zocher et al. | |
| 2016/0131095 A1 | 5/2016 | Martin et al. | |
| 2016/0333795 A1* | 11/2016 | Pollock | F16K 11/0873 |
| 2017/0138276 A1* | 5/2017 | Zhang | F02D 13/0234 |
| 2018/0016967 A1* | 1/2018 | Moore | F02B 33/44 |
| 2018/0320642 A1 | 11/2018 | Nakatani | |

FOREIGN PATENT DOCUMENTS

| | | |
|---|---|---|
| CN | 104126062 A | 10/2014 |
| CN | 104343546 A | 2/2015 |
| CN | 105317562 A | 2/2016 |
| CN | 105705763 A | 6/2016 |
| CN | 106414959 A | 2/2017 |
| CN | 108343515 A | 7/2018 |
| DE | 10332208 A1 | 2/2005 |
| EP | 1136675 A2 | 9/2001 |
| EP | 1387075 A1 | 2/2004 |
| EP | 2458182 A1 | 5/2012 |
| FR | 3022968 A1 | 1/2016 |
| JP | 58-073935 U | 5/1983 |
| JP | 59-002974 U | 1/1984 |
| JP | 59-115457 A | 7/1984 |
| JP | H04-111968 U | 9/1992 |
| JP | 05-256231 A | 10/1993 |
| JP | 11-210479 A | 8/1999 |
| JP | 2002-188531 A | 7/2002 |
| JP | 2004-124738 A | 4/2004 |
| JP | 2004169580 A | 6/2004 |
| JP | 2005-180309 A | 7/2005 |
| JP | 2007-224807 A | 9/2007 |
| JP | 2019-544889 A | 12/2009 |
| JP | 2013-245602 A | 12/2013 |
| JP | 2014173526 A | 9/2014 |
| JP | 2017-115646 A | 6/2017 |
| KR | 1020070102701 | 10/2007 |
| WO | 0214721 A1 | 2/2002 |
| WO | 2017/130556 A1 | 8/2017 |

* cited by examiner (a)

(b)

TEMPERATURE CONTROL THROTTLE DEVICE FOR AN ENGINE

CROSS-REFERENCE TO RELATED APPLICATIONS

The instant application claims priority to Chinese patent application Nos. 201810208318.7 filed on Mar. 14, 2018, and 201810947753.1 filed on Aug. 20, 2018, the entire disclosures of which are hereby incorporated by reference.

TECHNICAL FIELD

The present disclosure relates to a field of air intake control of an engine, and more particularly, to a temperature control throttle device that can control an intake air temperature of an engine.

BACKGROUND

Generally speaking, spark-ignition engines, at least including a spark-ignition gasoline engine and a spark-ignition natural gas engine, employ a throttle to control an air intake amount of engine to control an engine load.

FIG. 1 is a view illustrating an existing spark-ignition engine throttle and an air intake pipeline. As shown in FIG. 1, engine intake air enters from an air filter 100 connected to a throttle 103 through a pipeline 101, and then enters the throttle 103 from a throttle inlet 102. According to load requirements of the engine, a throttle valve body 104 rotates to adjust an air flow amount entering the engine through the throttle 103. The intake air enters an engine 107 for combustion and doing work via a throttle outlet 105 and an intake pipeline 106 downstream of the throttle. Burned gas is exhausted through an exhaust pipeline 108 via a three-way catalytic converter (or other type of catalytic converter) 109 and a muffler 110.

It can be seen from FIG. 1 that the existing throttle implementation scheme can control the air intake amount of the engine, however, under different intake air amounts, the heat exchange condition for the intake air is constant, and is generally close to an ambient temperature. Therefore, in the case of low temperature and low load, neither the fuel economy nor engine emissions can be effectively ensured.

SUMMARY

In view of the working principle of spark-ignition engines, the tendency of engine knocking is extremely slight when the load is low, and thus, properly increasing the engine intake air temperature does not cause knocking, while it may reduce pumping loss, improve oil and gas premixing, and accelerate combustion velocity. When the load is high, the intake air temperature should be lower to suppress knocking and ensure normal combustion.

Thus, on one hand, the present disclosure aims to solve the problem of how to control the intake air temperature of the engine under different loads in a reliable and low-cost manner.

According to an aspect of the present disclosure, there is provided a temperature control throttle device, including: at least one throttle; a first pipeline and a second pipeline, wherein the first pipeline and the second pipeline are connected to the same side of the at least one throttle in an air flow direction in parallel, wherein the second pipeline is provided with a heat exchanger that heats air flowing through the second pipeline with engine coolant, engine oil or engine exhaust gas as a heat source.

With the temperature control throttle device according to the embodiments of the present disclosure, temperature control of the engine may be realized; intake air heating may be provided when the engine load is low, which may reduce gas pumping power of the engine and improve the oil and gas mixing, thereby improving oil consumption and reducing emissions; and meanwhile, when the engine is fully loaded, the original intake air temperature may be maintained to ensure that the engine's full load combustion characteristic and performance are not affected. In addition, since the temperature control is realized by directly controlling the air, there is almost no delay in temperature change, thermal inertia does not exist, and complexity of control is reduced.

BRIEF DESCRIPTION OF THE DRAWINGS

Those of ordinary skill in the art may better understand the inventive concept of the present disclosure from the description taken in conjunction with the following drawings, wherein.

DETAILED DESCRIPTION

Hereinafter, the present disclosure is described more sufficiently with reference to the drawings in which the exemplary embodiments of the present disclosure are illustrated. However, the present disclosure may be implemented in many different manners and should not be interpreted to be limited to the embodiments proposed hereby. Rather, these exemplary embodiments are provided to allow the present disclosure to be complete and thorough, and sufficiently convey the scope of the present disclosure to those skilled in the art.

According to the embodiments of the present disclosure, engines that may employ the temperature control throttle device of the present disclosure include, but not limited to: engines with natural air intake forms, turbocharged engines or supercharged engines of other forms, spark-ignition engines, compression-ignition engines, and the like.

Figure 1:
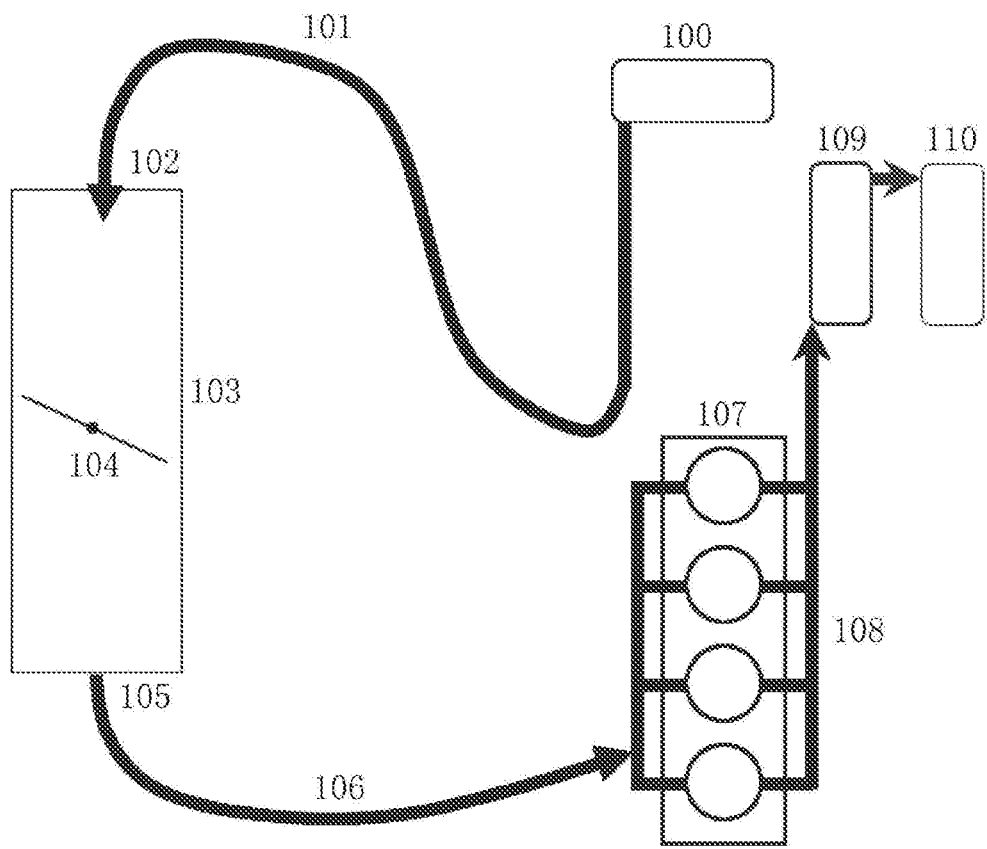
FIG. 1 is a view illustrating an existing spark-ignition engine throttle and an intake pipeline.
Figure 2A:
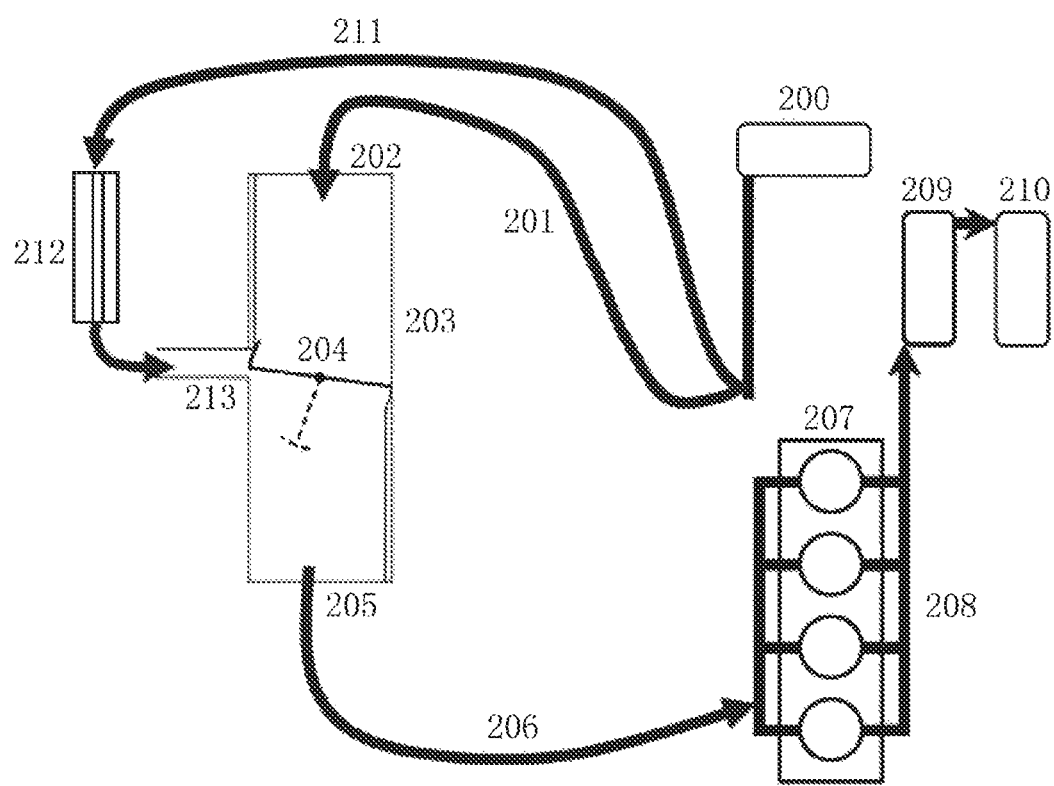
FIG. 2A is a view illustrating a temperature control throttle device according to an embodiment of the present disclosure.

FIG. 2A is a view illustrating a temperature control throttle device according to an embodiment of the present disclosure.

Referring to FIG. 2A, the temperature control throttle device includes a throttle 203, a first pipeline 201 and a second pipeline 211, wherein the first pipeline 201 and the second pipeline 211 are connected to the same side of the throttle 203 in parallel in the air flow direction. In FIG. 2A, the first pipeline 201 and the second pipeline 211 are positioned upstream of the throttle 203 in parallel. The second pipeline 211 is provided with a heat exchanger 212. The heat exchanger 212 may heat the air flowing through the second pipeline 211 with engine coolant, engine oil or engine exhaust gas as a heat source. In addition, the throttle 203 has a first inlet 202 connected to the first pipeline 201, a second inlet 213 connected to the second pipeline 211, and an outlet 205 connected to an engine air-intake manifold 206. Alternatively, the second pipeline 211 may be provided with a control device therein for changing a flow resistance characteristic, which will be described in detail later.

Here, when the heat exchanger 211 heats the air flowing through the second pipeline 211 with the engine coolant as the heat source, the heat exchanger 212 may be disposed in an engine cylinder block or in a water jacket of the engine cylinder head for cost saving. However, the heat exchanger 212 may also be disposed outside of the engine cylinder block as an independent heat exchanger. When the heat exchanger 211 heats the air flowing through the second pipeline 211 with the engine oil as the heat source, the heat exchanger 212 may be disposed in an oil sump or in an oil bypass pipeline. When the heat exchanger 211 heats the air flowing through the second pipeline 211 with the engine exhaust gas as the heat source, the heat exchanger 212 may be disposed after a main catalytic converter or disposed between a preliminary catalytic converter and the main catalytic converter.

During working, the engine intake air first passes through an air filter 200. Thereafter, the intake air is divided into two paths, passing through the first pipeline (also referred to as a conventional pipeline) 201 and the second pipeline (also referred to as a heating pipeline) 211, respectively. In the conventional pipeline 201, the intake air is not be specially heated, while in the heating pipeline 211, the intake air may be heated through the heat exchanger 212. The intake air in the conventional pipeline 201 enters the throttle 203 through the first inlet (also referred to as a first air inlet) 202 of the throttle 203, while the intake air in the heating pipeline 211 enters the throttle 203 through the second inlet (also referred to as an air inlet) 213 of the throttle. Through a position control of the throttle valve body 204, the normal temperature intake air entering from the first inlet 202 and the heated intake air entering from the second inlet 213 are selectively exhausted from the outlet 205 of the throttle, and then delivered to the engine 207 for combustion and doing work via a pipeline (e.g., the engine air-intake manifold 206) downstream of the throttle 203. Burned gas is exhausted through an exhaust pipeline 208 via a three-way catalytic converter (or other type of catalytic converter) 209 and a muffler 210. In this way, the temperature control of the intake air of the engine can be realized.

Figure 2B:
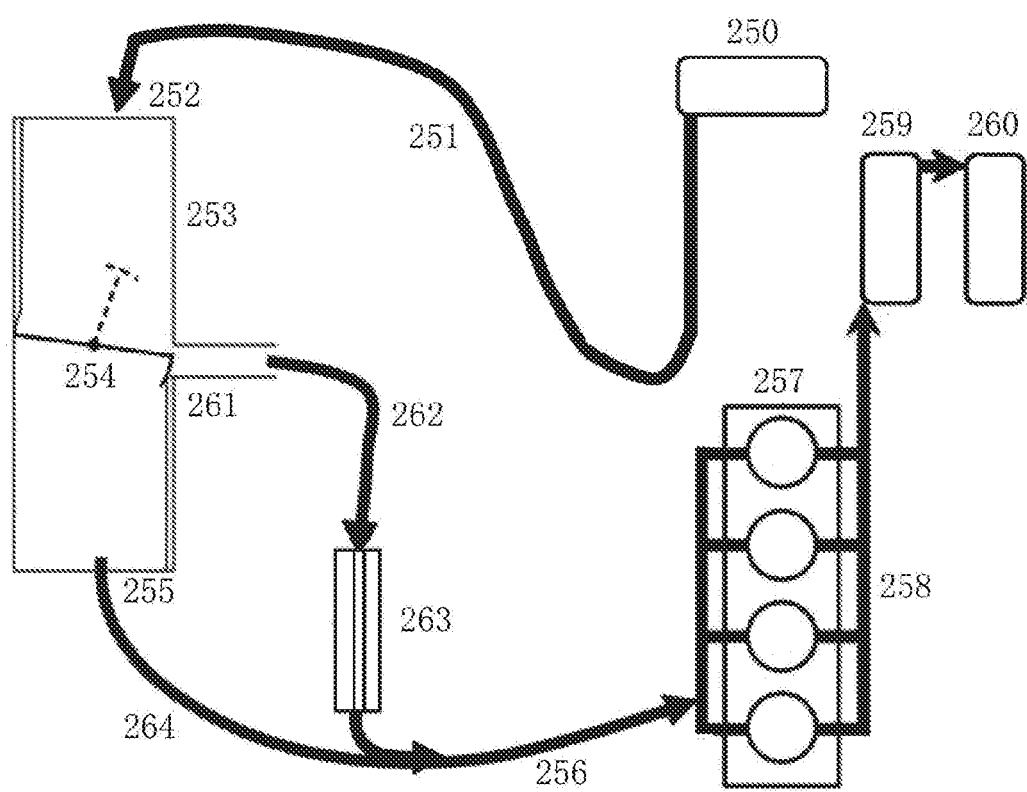
FIG. 2B is a view illustrating a temperature control throttle device according to another embodiment of the present disclosure.

FIG. 2B is a view illustrating a temperature control throttle device according to another embodiment of the present disclosure.

Referring to FIG. 2B, the temperature control throttle device includes a throttle 253, and a first pipeline 264 and a second pipeline 262 connected to the same side of the throttle 253 in the air flow direction in parallel. In FIG. 2B, the first pipeline 264 and the second pipeline 262 are located downstream of the throttle 253 in parallel and are connected to the engine air-intake manifold 256, respectively. The second pipeline 262 is provided with a heat exchanger 263. The heat exchanger 263 may heat the air flowing through the second pipeline 262 with engine coolant, engine oil or engine exhaust gas as a heat source. In addition, the throttle 253 has an air intake inlet 252, a first outlet 255 connected to the first pipeline 264, and a second outlet 261 connected to the second pipeline 262.

During working, the engine intake air enters from an air filter 250, connected to the throttle 253 through an intake pipeline 251, and enters the throttle 253 from the intake inlet 252. Through the rotation of a throttle valve body 254, the gas entering the throttle 253 selectively enters the first pipeline 264 through the first outlet 255 or enters the second pipeline 262 (i.e., the heating pipeline) through the second outlet 261, thereby realizing temperature control of the intake air. The intake air of the first pipeline 264 and the intake air of the second pipeline 262 are merged into an air-intake manifold (e.g., the engine air-intake manifold 256) and then delivered to an engine 257 for combustion and doing work. Burned gas is exhausted through a gas exhaust pipeline 258 via a three-way catalytic converter (or other type of catalytic converter) 259 and a muffler 260.

Figure 3A:
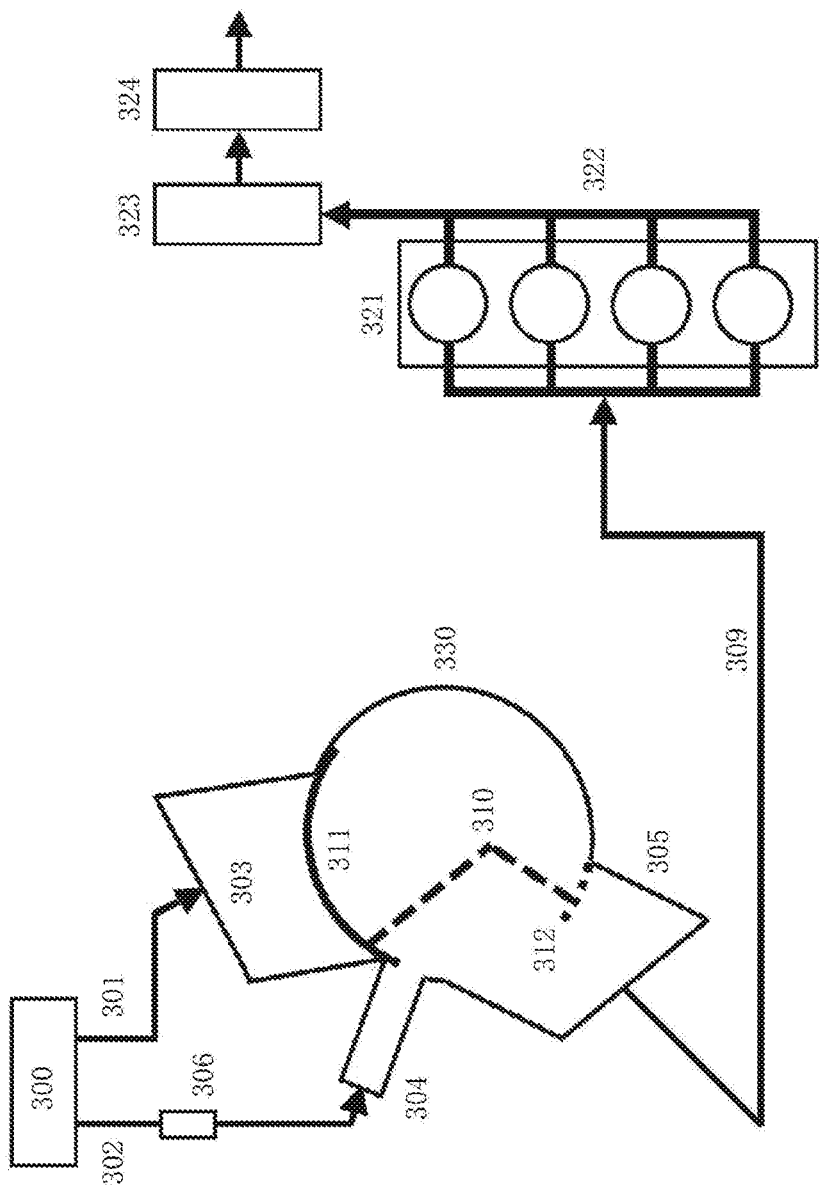
FIG. 3A is a view illustrating a temperature control throttle device according to still another embodiment of the present disclosure.

FIG. 3A is a view illustrating a temperature control throttle device according to another embodiment of the present disclosure.

Referring to FIG. 3A, a temperature control throttle device includes a throttle 330, a first pipeline 301 and a second pipeline 302, wherein the first pipeline 301 and the second pipeline 302 are connected to the same side of the throttle 330 in the air flow direction in parallel. In FIG. 3A, the first pipeline 301 and the second pipeline 302 are located upstream of the throttle 330 in parallel. The second pipeline 302 is provided with a heat exchanger 306. The heat exchanger 306 may heat the air flowing through the second pipeline 302 with engine coolant, engine oil or engine exhaust gas as a heat source. In addition, the throttle 330 has a first inlet 303 connected to the first pipeline 301, a second inlet 304 connected to the second pipeline 302, and an outlet 305 connected to the engine air-intake manifold 309. The first inlet 303 and the second inlet 304 may be arranged physically adjacent to each other, and match with a valve body 310 of the throttle 330 in a planar surface or a curved surface (in the present embodiment, they match in the curved surface). As the valve body 310 performs a motion in the planar surface or the curved surface (in the preset embodiment, the motion is in the curved surface), the second inlet 304 is first opened, and as the valve body 310 continues to perform the motion in the planar surface or in the curved surface (in the preset embodiment, the motion is in the curved surface) beyond a first predetermined position, the first inlet 303 is opened. This will be described in detail later. Alternatively, the second pipeline 302 may be provided therein with a control device for changing a thermal boundary of the air flowing through the pipeline.

Here, when the heat exchanger 306 heats the air flowing through the second pipeline 302 with the engine coolant as the heat source, the heat exchanger 306 may be disposed in an engine cylinder block or disposed in a water jacket of the engine cylinder head for cost saving. However, the heat exchanger 306 may also be disposed outside of the engine cylinder block as an independent heat exchanger. When the heat exchanger 306 heats the air flowing through the second pipeline 302 with the engine oil as the heat source, the heat exchanger 306 may be disposed in an oil sump or in an oil bypass pipeline. When the heat exchanger 306 heats the air flowing through the second pipeline 302 with the engine exhaust gas as the heat source, the heat exchanger 306 may be disposed after a main catalytic converter or disposed between a preliminary catalytic converter and the main catalytic converter.

During working, the engine intake air first passes through an air filter 300. Thereafter, the intake air is divided into two paths, passing through the first pipeline (also referred to as a conventional pipeline) 301 and the second pipeline (also referred to as a heating pipeline) 302, respectively. In the conventional pipeline 301, the intake air is not be specially heated, while in the heating pipeline 302, the intake air may be heated through the heat exchanger 306. The intake air in the conventional pipeline 301 enters the throttle 330 through the first inlet (also referred to as a first air inlet) 303 of the throttle 330, while the intake air in the heating pipeline 302 enters the throttle 330 through the second inlet (also referred to as an air inlet) 304 of the throttle 330. The valve body 310 of the throttle 330 forms sealing with the first inlet 303 and the second inlet 304. Through a position control of the valve body 310, the normal temperature intake air entering from the first inlet 303 and heated intake air entering from the second inlet 304 are selectively exhausted from the outlet 305, and then delivered into an engine 321 through the pipeline (e.g., the engine air-intake manifold 309) downstream of the throttle 330 for combustion and doing work. Burned gas is exhausted through a gas exhaust pipeline 322 via a three-way catalytic converter (or other type of catalytic converter) 323 and a muffler 324. In this way, the temperature control of the intake air of the engine can be realized.

Specifically speaking, the throttle 330 may be, for example, in a form of cylinder, and the first inlet 303, the second inlet 304, and the outlet 305 may be disposed on the side wall of the cylinder, wherein the first inlet 303 and the second inlet 304 are arranged physically adjacent to each other, and match with the valve body 310 in a curved surface. The cross-sectional area of the first inlet 303 may be bigger than that of the second inlet 304. Alternatively, either end of the valve body 310 may be provided with an optional blocking member. The blocking member may include a first blocking member 311 and a second blocking member 312. The blocking members may be in a close contact with a side wall of the throttle 330, thereby forming sealing with the side wall of the throttle 330. When the engine is not working, the blocking members of the valve body 310 block the first inlet 303 and the second inlet 304, thereby preventing air from passing through the throttle 330. As the valve body 310 rotates, the blocking of the blocking member to the second inlet 304 starts to be released, so that the second inlet 304 is opened. As the valve body 310 continues to rotate, the blocking degree of the blocking members to the second inlet 304 gradually decreases, and the opening degree of the second inlet gradually increases until the second inlet is fully opened. For example, as the valve body 310 continues to rotate beyond the first predetermined position, the blocking of the blocking member to the second inlet 304 is fully released, so that the second inlet 304 is fully opened. On the other hand, as the valve body 310 continues to rotate beyond the first predetermined position, the blocking of the blocking members to the first inlet 303 starts to be released, so that the first inlet 303 is opened. As the valve body 310 continues to rotate, the blocking degree of the blocking members to the first inlet 303 gradually decreases, and the opening degree of the first inlet 303 gradually increases until the first inlet 303 is fully opened. For example, as the valve body 310 continues to rotate beyond a second predetermined position, the blocking of the blocking member to the first inlet 303 is fully released, so that the first inlet 303 is fully opened. On the other hand, as the valve body 310 continues to rotate beyond the second predetermined position from the first predetermined position, the blocking member may block the second inlet 304. This will be described in detail later with reference to FIG. 4.

Figure 3B:
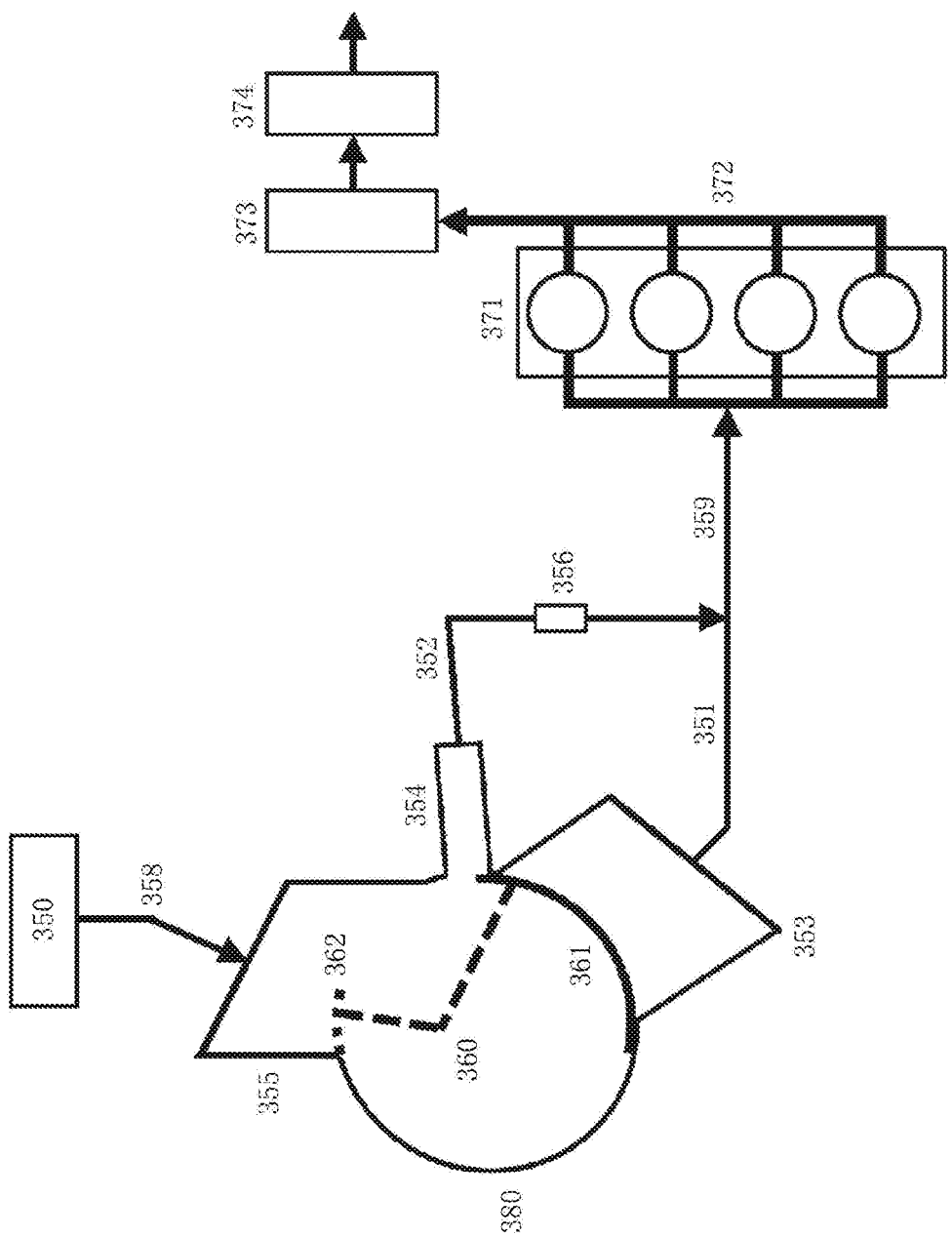
FIG. 3B is a view illustrating a temperature control throttle device according to yet another embodiment of the present disclosure.

FIG. 3B is a view illustrating a temperature control throttle device according to another embodiment of the present disclosure.

Referring to FIG. 3B, the temperature control throttle device includes a throttle 380, a first pipeline 351 and a second pipeline 352, wherein the first pipeline 351 and the second pipeline 352 are connected to the same side of the throttle 380 in the air flow direction in parallel. In FIG. 3B, the first pipeline 351 and the second pipeline 352 are located downstream of the throttle 380 in parallel and are respectively connected to the engine air-intake manifold 359. The second pipeline 352 is provided with a heat exchanger 356. The heat exchanger 356 may heat the air flowing through the second pipeline 352 with engine coolant, engine oil or engine exhaust gas as a heat source. In addition, the throttle 380 has an inlet 355, a first outlet 353 connected to the first pipeline 351, and a second outlet 354 connected to the second pipeline 352. The first outlet 353 and the second outlet 354 may be arranged physically adjacent to each other, and match with a valve body 360 of the throttle 380 in a planar surface or a curved surface (in the present embodiment, they match in the curved surface). As the valve body 360 performs a motion in a planar surface or a curved surface (in the present embodiment, the motion is in the curved surface), the second outlet 354 is first opened, and as the valve body 360 continues to perform the motion in the planar surface or in the curved surface (in the present embodiment, the motion is in the curved surface) beyond a first predetermined position, the first outlet 353 is opened. This will be described in detail later.

During working, the engine intake air enters from an air filter 350, connected to the throttle 380 through an intake pipeline 358, and enters the throttle 380 from the inlet 355. Through a rotation of the valve body 360 of the throttle 380, the gas entering the throttle 380 selectively enters the first pipeline 351 through the first outlet 353 or enters the second pipeline (i.e., the heating pipeline) 352 through the second outlet 354, thereby realizing temperature control of the intake air. The intake air in the first pipeline 351 and the intake air in the second pipeline 352 are merged into the air-intake manifold (e.g., the engine air-intake manifold 359) to be delivered to an engine 371 for combustion and doing work. Burned gas is exhausted through a gas exhaust pipeline 372 via a three-way catalytic converter (or other type of catalytic converter) 373 and a muffler 374.

Specifically speaking, as mentioned above, the throttle 380 may be, for example, in a form of cylinder, and the inlet 355, the first outlet 353 and the second outlet 354 may be disposed on the side wall of the cylinder, wherein the first outlet 353 and the second outlet 354 are arranged physically adjacent to each other and match with the valve body 360 in a curved surface. The cross-sectional area of the first outlet 353 may be bigger than that of the second outlet 354. Alternatively, either end of the valve body 360 may be provided with an optional blocking member. The blocking member may include a first blocking member 361 and a second blocking member 362. The blocking members may be in a close contact with a side wall of the throttle 380, thereby forming sealing with the side wall of the throttle 380.

When the engine is not working, the blocking members of the valve body 360 block the first outlet 353 and the second outlet 354, thereby preventing air from passing through the throttle 380. As the valve body 360 rotates, the blocking of the blocking member to the second outlet 354 starts to be released, so that the second outlet 354 is opened. As the valve body 360 continues to rotate, the blocking degree of the blocking members to the second outlet 354 gradually decreases, while the opening degree of the second outlet 354 gradually increases until the second outlet is fully opened. For example, as the valve body 360 continues to rotate beyond the first predetermined position, the blocking of the blocking member to the second outlet 354 is fully released, so that the second outlet 354 is fully opened. On the other hand, as the valve body 360 continues to rotate beyond the first predetermined position, the blocking of the blocking member to the first outlet 353 starts to be released, so that the first outlet 353 is opened. As the valve body 360 continues to rotate, the blocking degree of the blocking members to the first outlet 353 gradually decreases, and the opening degree of the first outlet 353 gradually increases until the first outlet is fully opened. For example, as the valve body 360 continues to rotate beyond the second predetermined position, the blocking of the blocking member to the first outlet 353 is fully released, so that the first outlet 353 is fully opened. On the other hand, as the valve body 360 continues to rotate beyond the second predetermined position from the first predetermined position, the blocking member may block the second outlet 354.

Figure 4:
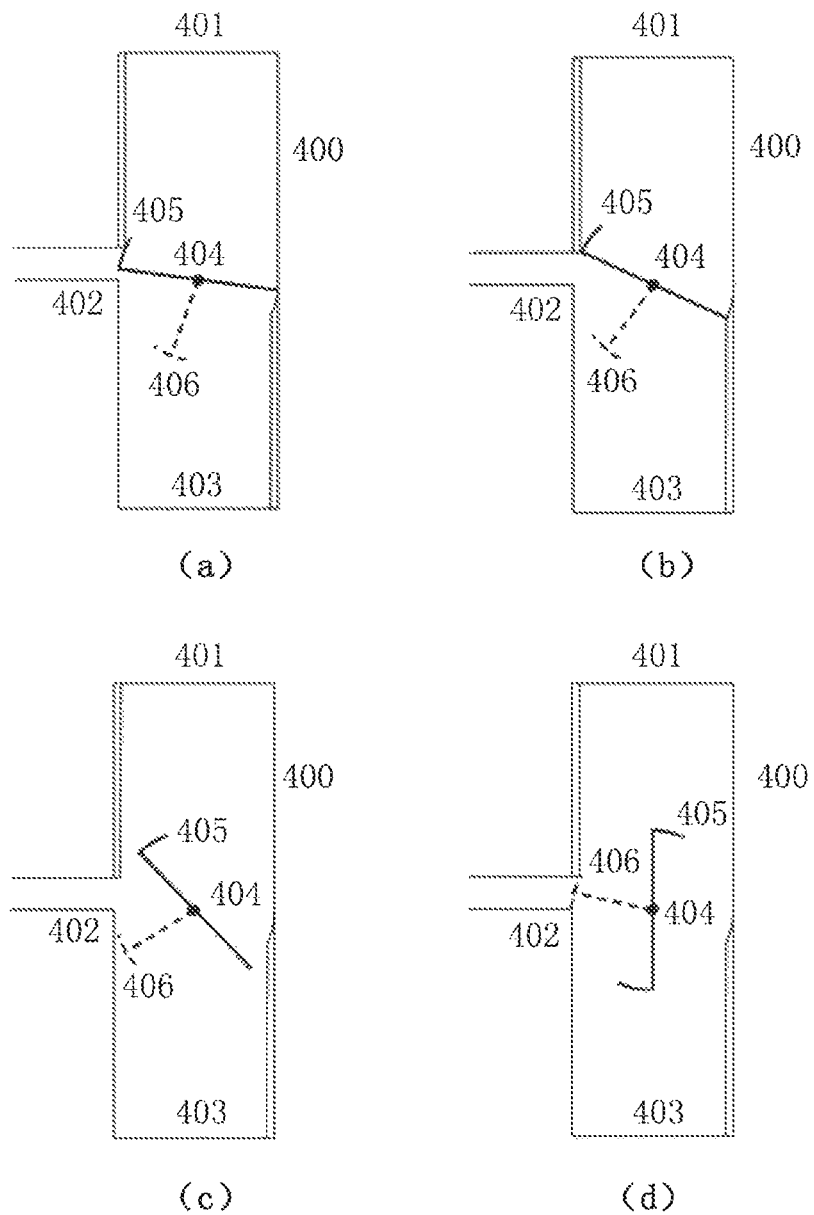
FIG. 4 is a view illustrating working states of a temperature control throttle device according to an embodiment of the present disclosure.

FIG. 4 is a view illustrating working states of a temperature control throttle device according to an embodiment of the present disclosure.

Referring to FIG. 4, a throttle 400 includes a first inlet 401 connected the conventional pipeline, a second inlet 402 connected to the heating pipeline, and an outlet 403. In addition, two ends of a valve body 404 of the throttle 400 are provided with a first blocking member (also referred to as the first valve body fin) 405 and a second blocking member, respectively. Alternatively, the valve body 404 may also be provided with an optional extended member extending from the center of the valve body in a direction at a predetermined angle to the valve body (e.g., a direction perpendicular to the valve body, but not limited thereto), and a third blocking member (also referred to as the second valve body fin) 406 disposed at an end of the extended member.

The (a), (b), (c) and (d) in FIG. 4 show working states of the temperature control throttle device corresponding to different loads of the engine, respectively. The (a) of FIG. 4 shows a working state of the throttle when the engine is idling, the (b) of FIG. 4 shows a working state of the throttle when the engine load is low, the (c) of FIG. 4 shows a working state of the throttle when the engine load is high, and the (d) of FIG. 4 shows a working state of the throttle when the engine is fully loaded. Firstly, when the engine is not working, the valve body 404 is in a horizontal state, and the first blocking member 405 and the second blocking member form sealing with two side walls of the throttle 400, thereby preventing air from passing through the throttle 400. Meanwhile, the first blocking member 405 also blocks the second inlet 402. Thereafter, as shown in (a) of FIG. 4, when the engine enters an idle state, the valve body 404 starts to rotate. As the valve body 404 rotates, the blocking degree of the first blocking member 405 to the second inlet 402 gradually decreases, heated intake air starts to enter the throttle 400 through the opened second inlet 402, and enters the engine air-intake manifold through the outlet 403. Meanwhile, the sealing formed between the first blocking member 405 and the second blocking member and the two side walls of the throttle 400 is maintained, and in this way, the intake air passing through the first inlet 401 is still blocked by the valve body 404. As shown in (b) of FIG. 4, when the engine enters a state of low load, the valve body 404 continues to rotate. As the valve body 404 rotates, the blocking degree of the first blocking member 405 to the second inlet 402 further decreases, more and more heated intake air enters the throttle 400 through the second inlet 402 of which the opening degree becomes bigger and bigger. That is to say, the first blocking member 405 may be used to control the air flow amount entering from the heating pipeline via the second inlet 402.

On the other hand, when the valve body 404 rotates over a predetermined threshold angle, the sealing between the first blocking member 405 and the second blocking member and two side walls of the throttle 400 is released, unheated intake air may enter the throttle 400 through the first inlet 401, and intake air temperature starts to decrease. As shown in (c) of FIG. 4, when the engine enters a state of high load, the valve body 404 continues to rotate. As the valve body 404 rotates, more and more unheated intake air enters the throttle 400 through the first inlet 401. In particular, since the first inlet 401 is far bigger than the second inlet 402, the ratio of the unheated intake air in the intake air passing through the outlet 403 becomes higher and higher. As shown in (d) of FIG. 4, when the engine enters a state of full load, the valve body 404 rotates 90 degrees, and the unheated intake air passes through the outlet 403 without any blocking. At this time, the ratio of heated intake air in the intake air passing through the outlet 403 may be negligible. On the other hand, in the case where the third blocking member 406 is provided, when the valve body 404 rotates 90 degrees, the third blocking member 406 may block the second inlet 402, and the heated intake air does not enter the throttle 400 through the second inlet 402, which ensures that the engine intake air temperature at this time is the same as that in the conventional state, and there will be no extra knocking burden.

Figure 5:
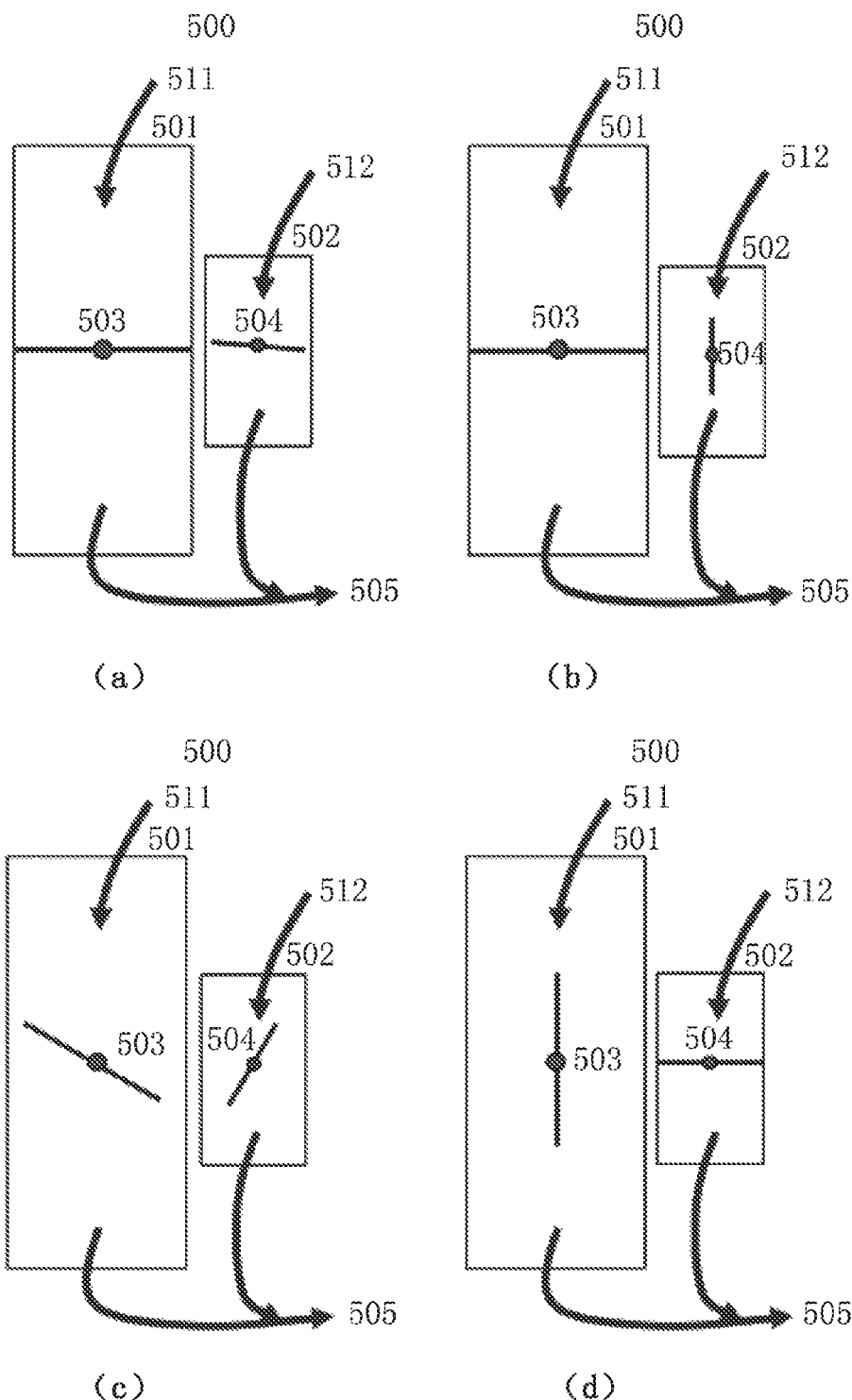
FIG. 5 is a view illustrating working states of a temperature control throttle device according to another embodiment of the present disclosure.

FIG. 5 is a view illustrating working states of a temperature control throttle device according to another embodiment of the present disclosure.

Referring to FIG. 5, the temperature control throttle device may include a first throttle and a second throttle. The first pipeline or conventional pipeline 511 and the second pipeline or heating pipeline 512 are connected to the same side of the first throttle and the second throttle in the air flow direction (at the upstream of the first throttle and the second throttle, as shown in FIG. 5) in parallel, and the second pipeline 512 is provided with a heat exchanger (not shown). A valve body 503 of the first throttle and a valve body 504 of the second throttle may have a fixed motion relationship. That is to say, the valve body 503 and the valve body 504 have a definite mechanical correlation, so that they can be driven by one actuator. Alternatively, the valve body 503 and the valve body 504 may also be driven by two actuators, respectively. This will be described in detail below with reference to FIG. 5.

Similar to FIG. 4, the (a), (b), (c) and (d) of FIG. 5 show working states of the temperature control throttle device corresponding to different loads of the engine, respectively. The (a) of FIG. 5 shows a working state of the throttle when the engine is idling, the (b) of FIG. 5 shows a working state of the throttle when the engine load is low, the (c) of FIG. 5 shows a working state of the throttle when the engine load is high, and the (d) of FIG. 5 shows a working state of the throttle when the engine is fully loaded. As shown in (a) of FIG. 5, when the engine enters idling, the valve body 504 first rotates while the valve body 503 remains stationary. Heated intake air enters the second throttle through the second inlet 502, and enters an engine air-intake manifold 505 through the second throttle, while unheated air is blocked by the valve body 503 and cannot pass through the first throttle. As shown in (b) of FIG. 5, when the engine enters a state of low load, the valve body 504 continues to rotate up to 90 degrees, more and more heated intake air passes through the second throttle. Thereafter, as the valve body 504 rotates over 90 degrees, the valve body 503 starts to rotate. As shown in (c) of FIG. 5, when the engine enters a state of high load, as the valve body 504 rotates over 90 degrees, the valve body 503 starts to rotate, so that unheated intake air enters the first throttle through the first inlet 501, and enters the engine air-intake manifold 505 through the first throttle, while less and less heated air passes through the second throttle. As shown in (d) of FIG. 5, when the engine enters a state of full load, the valve body 504 rotates 180 degrees to fully block the second throttle, so that the second throttle is closed, and the heated air is blocked by the valve body 504 and no longer passes through the second throttle. Meanwhile, the valve body 503 rotates to 90 degrees, the first throttle is fully opened, and unheated intake air enters the engine air-intake manifold 505 through the first throttle without any blocking. In this way, it is ensured that any air does not enter from the heating pipeline when the engine is fully loaded, and thereby ensuring that the engine intake air temperature is the same as that in the conventional state, and there will be no extra knocking burden. When two throttles are provided, the positional relationship of two valve bodies obviously may realize a maximum flexibility, thereby realizing a maximum flexibility of temperature control.

Figure 6:
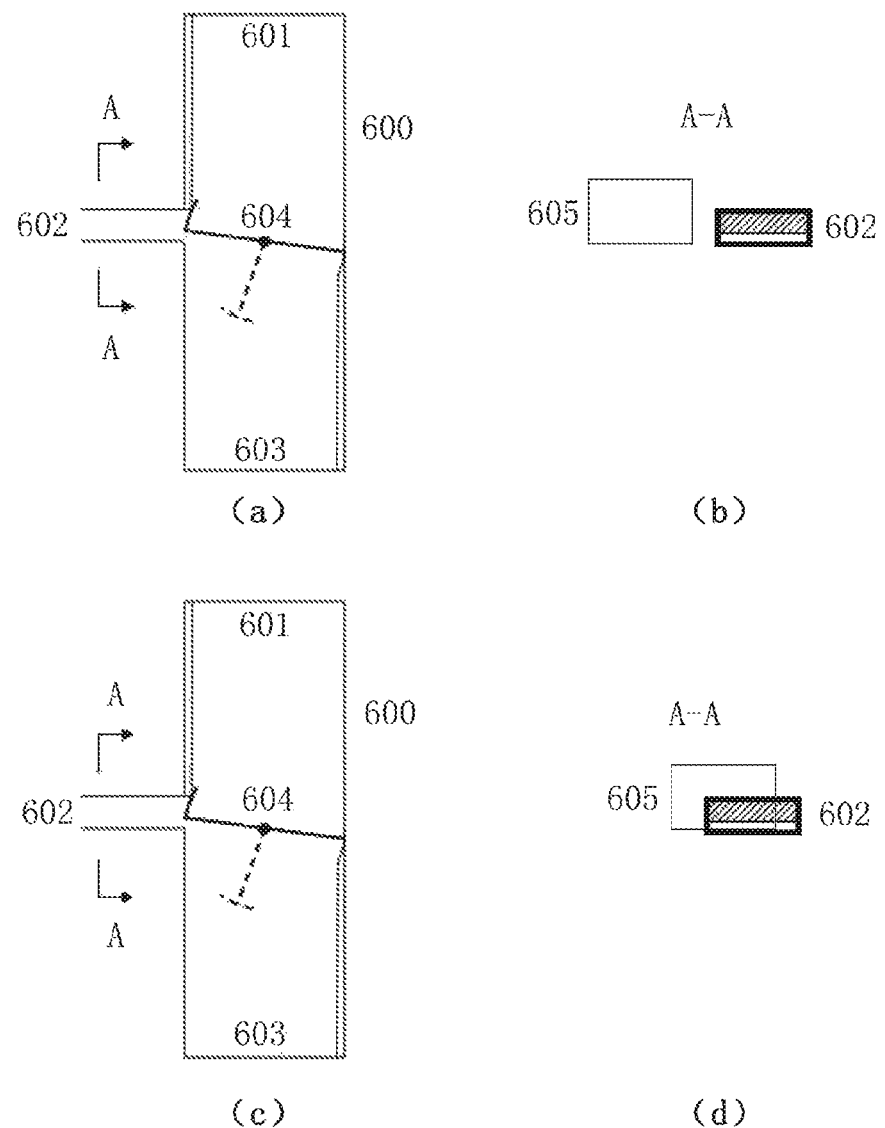
FIG. 6 is a view illustrating an example of changing a flow resistance characteristic by a temperature control throttle device according to an embodiment of the present disclosure.

FIG. 6 is a view illustrating an example of changing a flow resistance characteristic by a temperature control throttle device according to an embodiment of the present disclosure.

The example of changing the flow resistance characteristic shown in FIG. 6 is based on the temperature control throttle device shown in FIG. 4. When viewing from A-A direction, as shown in (a) of FIG. 6, the heating pipeline is connected to the second inlet (an air inlet) 602 as shown in (b) of FIG. 6, wherein the rectangle formed by thick solid lines is the second inlet 602. Since the valve body of the throttle partially blocks the intake air, a part of the area of the air inlet may effectively intake air, that is, a blank area not covered by the shadow shown in (b) of FIG. 6 is the area that can effectively intake air, while the shadow area is the area covered by the valve body (particularly, the second blocking member on the valve body). Reference numeral 605 indicates a slider that can slide left and right in the heating pipeline. According to an embodiment of the present disclosure, the slider 605 may be made of stainless steel or other wear resistant materials, but is not limited thereto. By controlling the slider 605 to slide, even as shown in (c) of FIG. 6, the valve body of the throttle is at the same position as the position shown in (a) of FIG. 6, when viewing from A-A direction as shown in (c) of FIG. 6, the effective intake air area shown in (d) of FIG. 6 is also different from that shown in (b) of FIG. 6, so that flow resistances on the gas entering the throttle may also be different. In other words, by providing the slider in the heating pipeline and controlling the slider to slide, the flow resistance characteristic of the heating pipeline may be changed.

Figure 7:
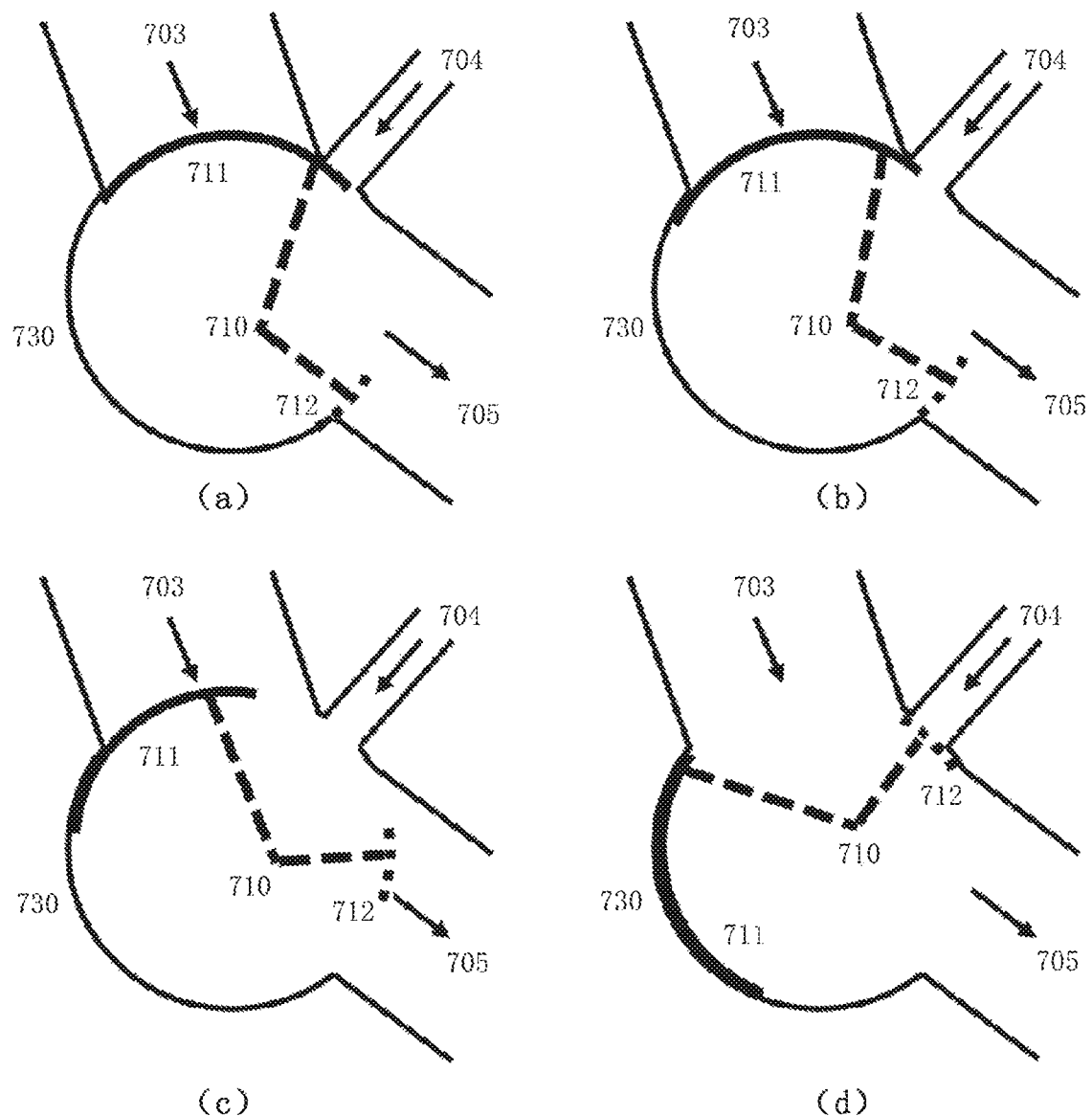
FIG. 7 is a view illustrating working states of a temperature control throttle device according to an embodiment of the present disclosure.

FIG. 7 is a view illustrating working states of a temperature control throttle device according to an embodiment of the present disclosure.

Referring to FIG. 7, a throttle 730 comprises a first inlet 703 connected to the conventional pipeline (i.e., the first pipeline), a second inlet 704 connected to the heating pipeline (i.e., the second pipeline), and an outlet 705. In addition, two ends of a valve body 710 of the throttle 730 are provided with an optional first blocking member (also referred to as the first valve body fin) 704 and an optional second blocking member (also referred to as the second valve body fin) 712, respectively. As mentioned above, the throttle 730 may be, for example, in a form of cylinder, and the first inlet 703, the second inlet 704, and the outlet 705 may be disposed on a side wall of the cylinder, and the first inlet 703 and the second inlet 704 may be arranged physically adjacent to each other and match with the valve body 710 in a curved surface. The valve body 710 may be in an irregular L shape, i.e., the angle between two wings of the L shape may not be an exact right angle, but may be, for example, an obtuse angle greater than 90 degrees.

The (a), (b), (c) and (d) of FIG. 7 show working states of the temperature control throttle device corresponding to different loads of the engine, respectively. The (a) of FIG. 7 shows a working state of the throttle when the engine is idling, the (b) of FIG. 7 shows a working state of the throttle when the engine load is low, the (c) of FIG. 7 shows a working state of the throttle when the engine load is high, and the (d) of FIG. 7 shows a working state of the throttle when the engine is fully loaded. First, when the engine is not working, the first blocking member 711 and the second blocking member 712 of the valve body 710 form sealing with the side wall of the throttle 730, thereby preventing air from passing through the throttle 730. At this time, the first blocking member 711 may block the first inlet 703 and the second inlet 704. Thereafter, when the engine enters an idle state as shown in (a) of FIG. 7, the valve body 710 starts to rotate. As the valve body 710 rotates, the blocking degree of the first blocking member 711 to the second inlet 704 gradually decreases, and heated intake air starts to enter the throttle 730 through the opened second inlet 704, and enter the engine air-intake manifold through the outlet 705. Meanwhile, the blocking of the first blocking member 711 to the first inlet 703 is maintained, and in this way, intake air passing through the first inlet 703 is still blocked by the value body 710 (i.e., the first blocking member 711). As shown in (b) of FIG. 7, when engine enters a state of low load, the valve body 710 continues to rotate. As the valve body 710 rotates, the blocking degree of the first blocking member 711 to the second inlet 704 further decreases until the blocking to the second inlet 704 is fully released, and more and more heated intake air enters the throttle 730 through the second inlet 704 of which the opening degree becomes bigger and bigger. That is to say, the first blocking member 711 may be used to control the air flow amount entering throttle 730 from the heating pipeline through the second inlet 704.

On the other hand, when the valve body 710 rotates over a predetermined threshold angle (i.e., when the valve body 710 rotates beyond a first predetermined position), the blocking of the first blocking member 711 to the first inlet 703 starts to be released, and unheated intake air may enter the throttle 730 through the first inlet 703, so that intake air temperature starts to decrease. As shown in (c) of FIG. 7, when the engine enters a state of high load, the valve body 710 continues to rotate. As the valve body 710 rotates, more and more unheated intake air enters the throttle 730 through the first inlet 703. Alternatively, in the case where the second blocking member 712 is provided, when the blocking of the first blocking member 711 to the first inlet 703 starts to be released, the second blocking member 712 starts to block the second inlet 704. In particular, since the cross-sectional area of the first inlet 703 is far bigger than that of the second inlet 704, while there is no heat exchanger in the first pipeline, the flow resistance in the first pipeline is lower than that in the second pipeline, and the ratio of the unheated intake air in the intake air passing through the outlet 705 becomes higher and higher. As shown in (d) of FIG. 7, when the engine enters a state of full load, the valve body 710 rotates to completely open the first inlet 703, and unheated intake air passes through the outlet 705 without any blocking. At this time, the ratio of heated intake air in the intake air passing through the outlet 705 may be negligible. On the other hand, in the case where the second blocking member 712 is provided, when the valve body 710 rotates beyond the second predetermined position (e.g., when the valve body 710 rotates to fully open the first inlet 703, but not limited thereto), the second blocking member 712 may fully block the second inlet 704, and in this way, the heated intake air does not enter the throttle 730 through the second inlet 704, which ensures that the engine intake air temperature is the same as that in the conventional state, and there will be no extra knocking burden.

Figure 8:
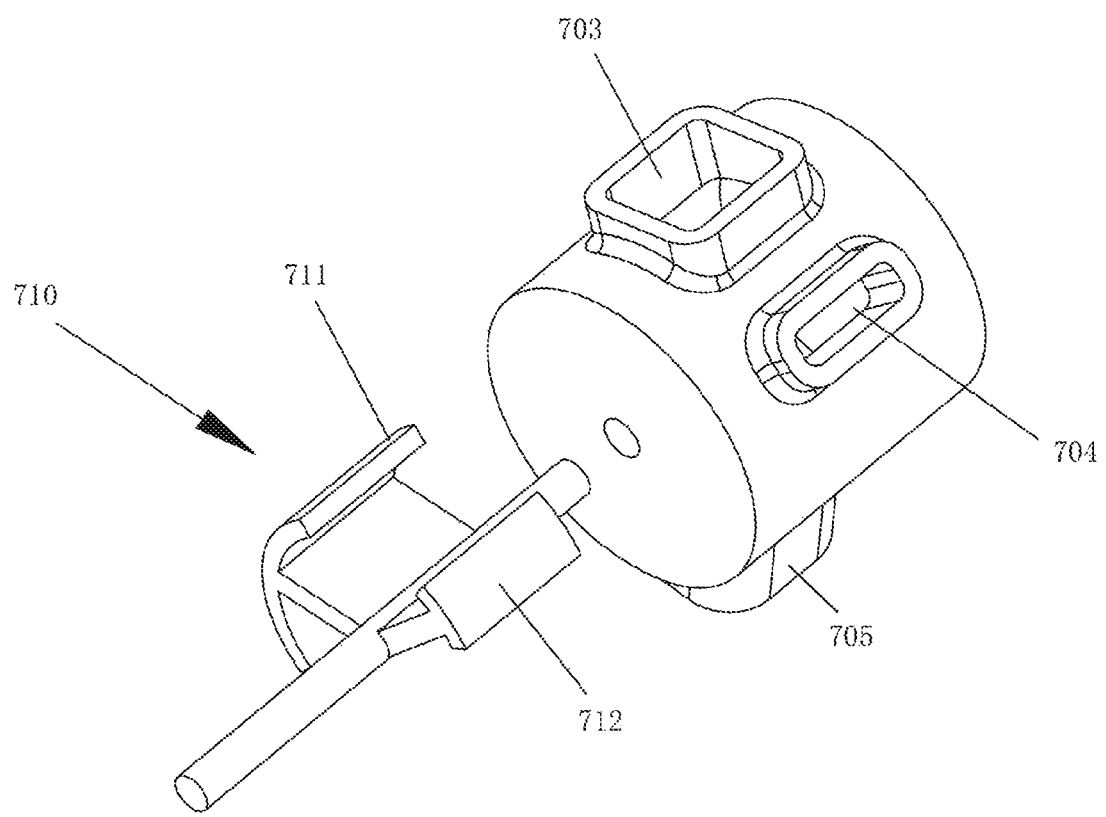
FIG. 8 is a perspective view illustrating a local part of a temperature control throttle device according to an embodiment of the present disclosure.

FIG. 8 is a perspective view illustrating a part of the temperature control throttle device according to an embodiment of the present disclosure.

Referring to FIG. 8, the throttle 730 is in a form of cylinder, the first inlet 703, the second inlet 704, and the outlet 705 may be disposed on a side wall of the cylinder, and penetrate through the side wall of the cylinder. The first inlet 703 and the second inlet 704 are arranged physically adjacent to each other, and match with the valve body 710 of the throttle 730 in a cured surface, and as the valve body 710 performs a motion in the curved surface, the second inlet 704 and the first inlet 703 may be opened in sequence. The first blocking member 711 and the second blocking member 712 form sealing with the side wall (specifically speaking, an inner wall) of the throttle 730. As described above, when the engine is not working, the first blocking member 711 may block the first inlet 703 and the second inlet 704. As the valve body 710 rotates, the blocking of the first blocking member 711 to the second inlet 704 is released while the blocking to the first inlet 703 is maintained, that is, the second inlet 704 starts to be opened while the first inlet 703 maintains being closed. As the valve body 710 continues to rotate, the blocking of the first blocking member 711 to the second inlet 704 may be fully released, that is, the second inlet 704 may be fully opened. When the valve body 710 rotates beyond the first predetermined position, the blocking of the first blocking member 711 to the first inlet 703 starts to be released, that is, the first inlet 703 starts to be opened. As the valve body 710 continues to rotate, the blocking of the first blocking member 711 to the first inlet 703 may be fully released, that is, the first inlet 703 may be fully opened. Meanwhile, when the valve body 710 rotates beyond the second predetermined position (e.g., when the blocking of the first blocking member 711 to the first inlet 703 is fully released, but not limited thereto), the second blocking member 712 may block the second inlet 704.

Figure 9:
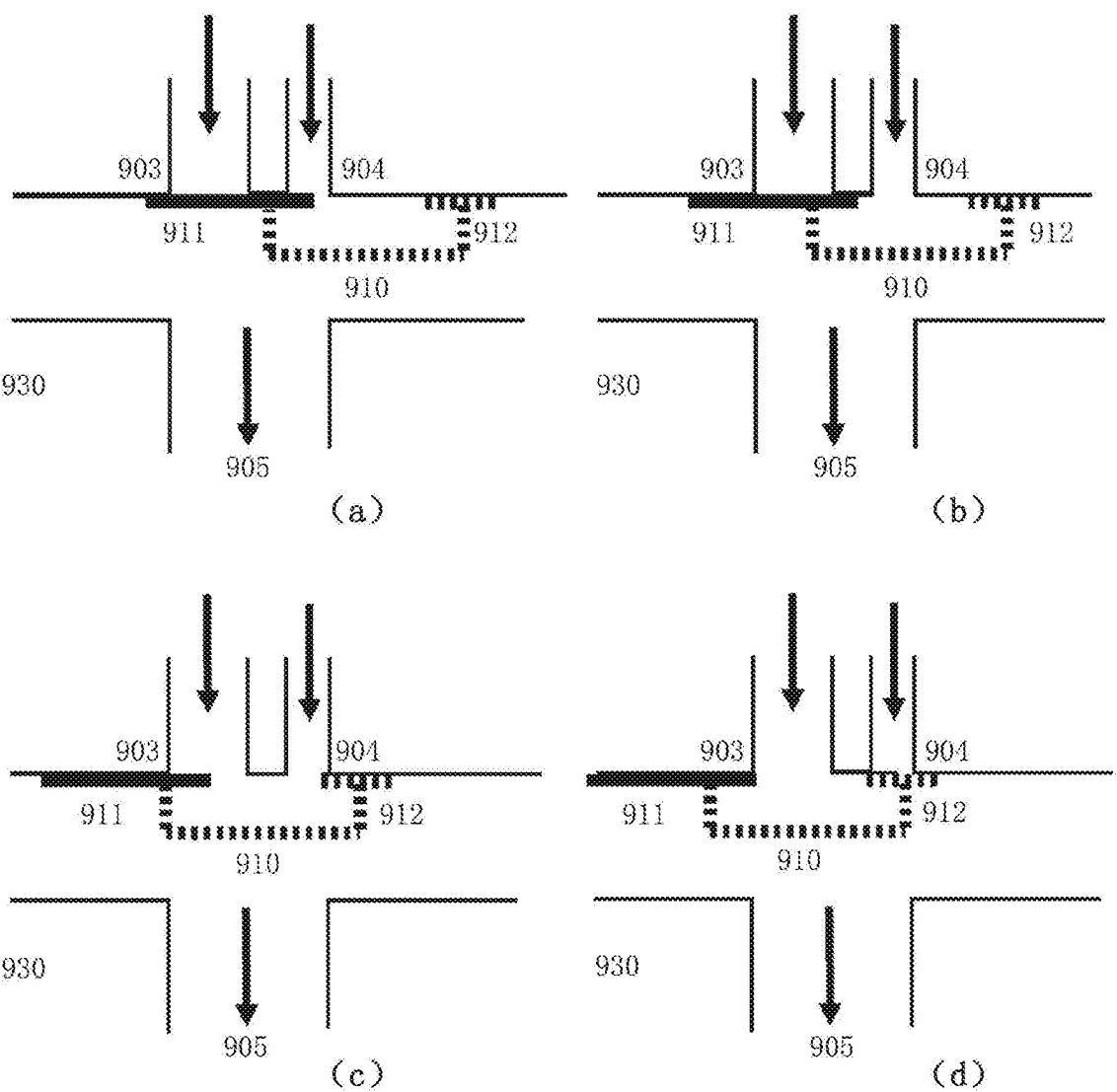
FIG. 9 is a view illustrating working states of a temperature control throttle device according to another embodiment of the present disclosure.

FIG. 9 is a view illustrating working states of a temperature control throttle device according to another embodiment of the present disclosure.

Referring to FIG. 9, a throttle 930 comprises a first inlet 903 connected the conventional pipeline (i.e., the first pipeline), a second inlet 904 connected to the heating pipeline (i.e., the second pipeline), and an outlet 905. In addition, two ends of a valve body 910 of the throttle 930 are provided with an optional first blocking member (also referred to as the first valve body fin) 911 and an optional second blocking member (also referred to as the second valve body fin) 912, respectively. In the present embodiment, the throttle 930 may be, for example, in a form of cuboid, the first inlet 903, the second inlet 904, and the outlet 905 may be disposed on two different side walls (e.g., two opposing side walls) of the cuboid, respectively, and the first inlet 903 and the second inlet 904 may be arranged physically adjacent to each other and match with the valve body 910 in a planar surface. The valve body 910 may be U-shaped or in a shape corresponding to the Chinese character of "凹".

The (a), (b), (c) and (d) of FIG. 9 show working states of the temperature control throttle device corresponding to different loads of the engine, respectively. The (a) of FIG. 9 shows a working state of the throttle when the engine is idling, the (b) of FIG. 9 shows a working state of the throttle when the engine load is low, the (c) of FIG. 9 shows a working state of the throttle when the engine load is high, and the (d) of FIG. 9 shows a working state of the throttle when the engine is fully loaded. Firstly, when the engine is not working, the first blocking member 911 and the second blocking member 912 of the valve body 910 form sealing with the side wall of the throttle 930, thereby preventing air from passing through the throttle 930. At this time, the first blocking member 911 may block the first inlet 903 and the second inlet 904. Thereafter, as shown in (a) of FIG. 9, when the engine enters an idle state, the valve body 910 starts to move (or translate). As the valve body 910 moves, the blocking degree of the first blocking member 911 to the second inlet 904 gradually decreases, the heated intake air starts to enter the throttle 930 through the opened second inlet 904, and enter the engine air-intake manifold via the outlet 905. Meanwhile, the blocking of the first blocking member 911 to the first inlet 903 is maintained, in this way, intake air passing through the first inlet 903 is still blocked by the valve body 910 (i.e., the first blocking member 911). As shown in (b) of FIG. 9, when the engine enters a state of low load, the valve body 910 continues to move. As the valve body 910 moves, the blocking degree of the first blocking member 911 to the second inlet 904 further decreases until the blocking to the second inlet 904 is fully released, more and more heated intake air enters the throttle 930 through the second inlet 904 of which the opening degree becomes bigger and bigger. That is to say, the first blocking member 911 may be used to control the air flow amount entering the throttle 930 from the heating pipeline through the second inlet 904.

On the other hand, when the valve body 910 moves beyond a first predetermined position, the blocking of the first blocking member 911 to the first inlet 903 starts to be released, unheated intake air may enter the throttle 930 through the first inlet 903, and intake air temperature starts to decrease. As shown in (c) of FIG. 9, when the engine enters a state of high load, the valve body 910 continues to move. As the valve body 910 moves, more and more unheated intake air enters the throttle 930 through the first inlet 903. Alternatively, in the case where the second blocking member 912 is provided, when the blocking of the first blocking member 911 to the first inlet 903 starts to be released, the second blocking member 912 starts to block the second inlet 904. In particular, since the cross-sectional area of the first inlet 903 is far bigger than the cross-sectional area of the second inlet 904, while there is no heat exchanger in the first pipeline, the flow resistance in the first pipeline is lower than that in the second pipeline, so that the ratio of the unheated intake air in the intake air passing through the outlet 905 becomes higher and higher. As shown in (d) of FIG. 9, when the engine enters a state of full load, the valve body 910 moves to completely open the first inlet 903, and unheated intake air passes through the outlet 905 without any blocking. Meanwhile, the ratio of heated intake air in the intake air passing through the outlet 905 may be negligible. On the other hand, in the case where the second blocking member 912 is provided, when the valve body 910 moves beyond the second predetermined position (e.g., when the valve body 910 moves to fully open the first inlet 903), the second blocking member 912 may fully block the second inlet 904, and in this way, the heated intake air does not enter the throttle 930 through the second inlet 904 so as to ensure that the engine intake air temperature is the same as that in the conventional state, and there will be no extra knocking burden.

Figure 10:
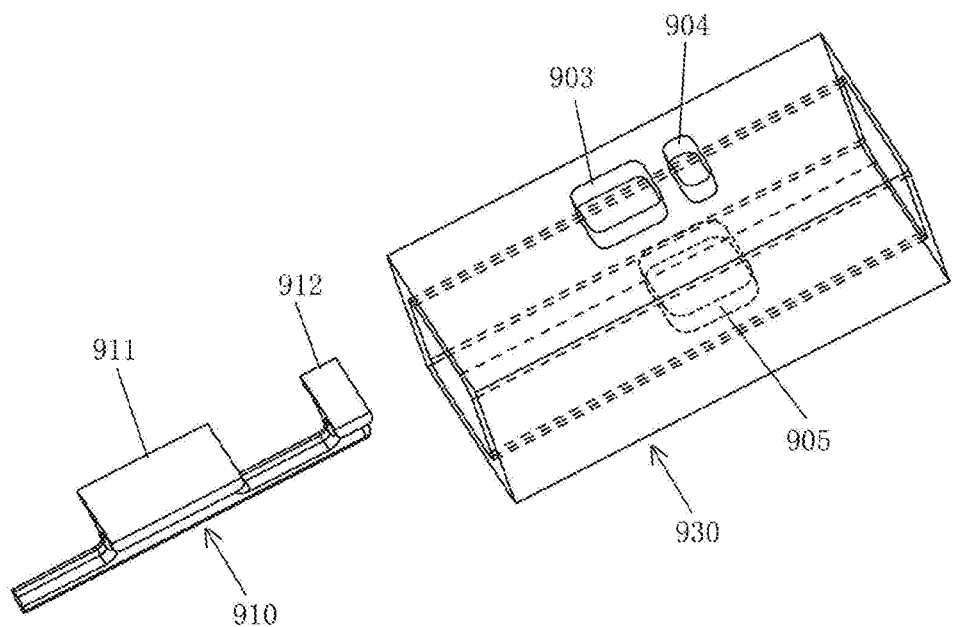
FIG. 10 is a perspective view illustrating a part of a temperature control throttle device according to another embodiment of the present disclosure.
Figure 10:
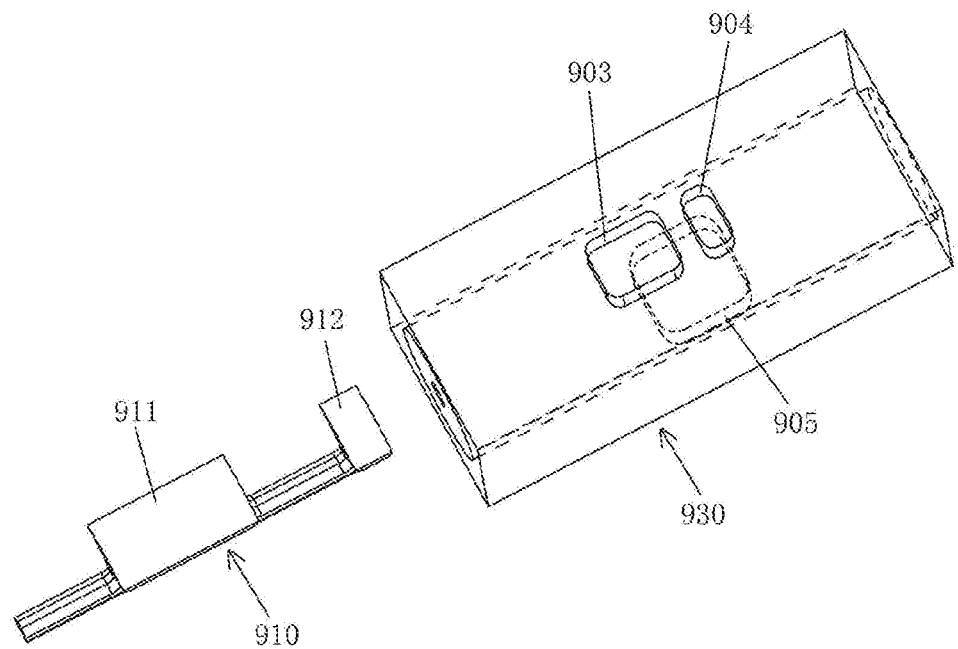

FIG. 10 is a perspective view illustrating a part of a temperature control throttle device according to another embodiment of the present disclosure.

Referring to FIG. 10, the throttle 930 is in a cuboid shape, the first inlet 903, the second inlet 904, and the outlet 905 may be disposed on a side wall of the cuboid, and penetrate through the side walls of the cuboid. The first inlet 903, the second inlet 904, and the outlet 905 may be disposed on two different side walls (e.g., two opposing side walls) of the cuboid, respectively, and penetrate through the side walls of the cuboid. The first inlet 903 and the second inlet 904 may be arranged physically adjacent to each other, and match with the valve body 910 in a planar or curved surface, and as the valve body 910 performs a motion in the planar or curved surface, the second inlet 904 and the first inlet 903 may be opened in sequence. The first blocking member 911 and the second blocking member 912 form sealing with the side wall (specifically speaking, an inner wall) of the throttle 930. For example, as shown in (a) of FIG. 10, the inner walls of the throttle 930 are planar surfaces, while as shown in (b) of FIG. 10, the inner walls of the throttle 930 are curved surfaces. As described above, when the engine is not working, the first blocking member 911 may block the first inlet 903 and the second inlet 904. As the valve body 910 moves, the blocking of the first blocking member 911 to the second inlet 904 starts to be released while the blocking to the first inlet 903 is maintained, that is, the second inlet 904 starts to be opened while the first inlet 903 maintains being closed. As the valve body 910 continues to move, the blocking of the first blocking member 911 to the second inlet 904 may be fully released, that is, the second inlet 904 may be fully opened. When the valve body 910 moves beyond the first predetermined position, the blocking of the first blocking member 911 to the first inlet 903 starts to be released, that is, the first inlet 903 starts to be opened. As the valve body 910 continues to move, the blocking of the first blocking member 911 to the first inlet 903 may be fully released, that is, the first inlet 903 may be fully opened. Meanwhile, when the valve body 910 moves beyond the second predetermined position (e.g., when the blocking of the first blocking member 911 to the first inlet 903 is fully released), the second blocking member 912 may block the second inlet 904.

Figure 11:
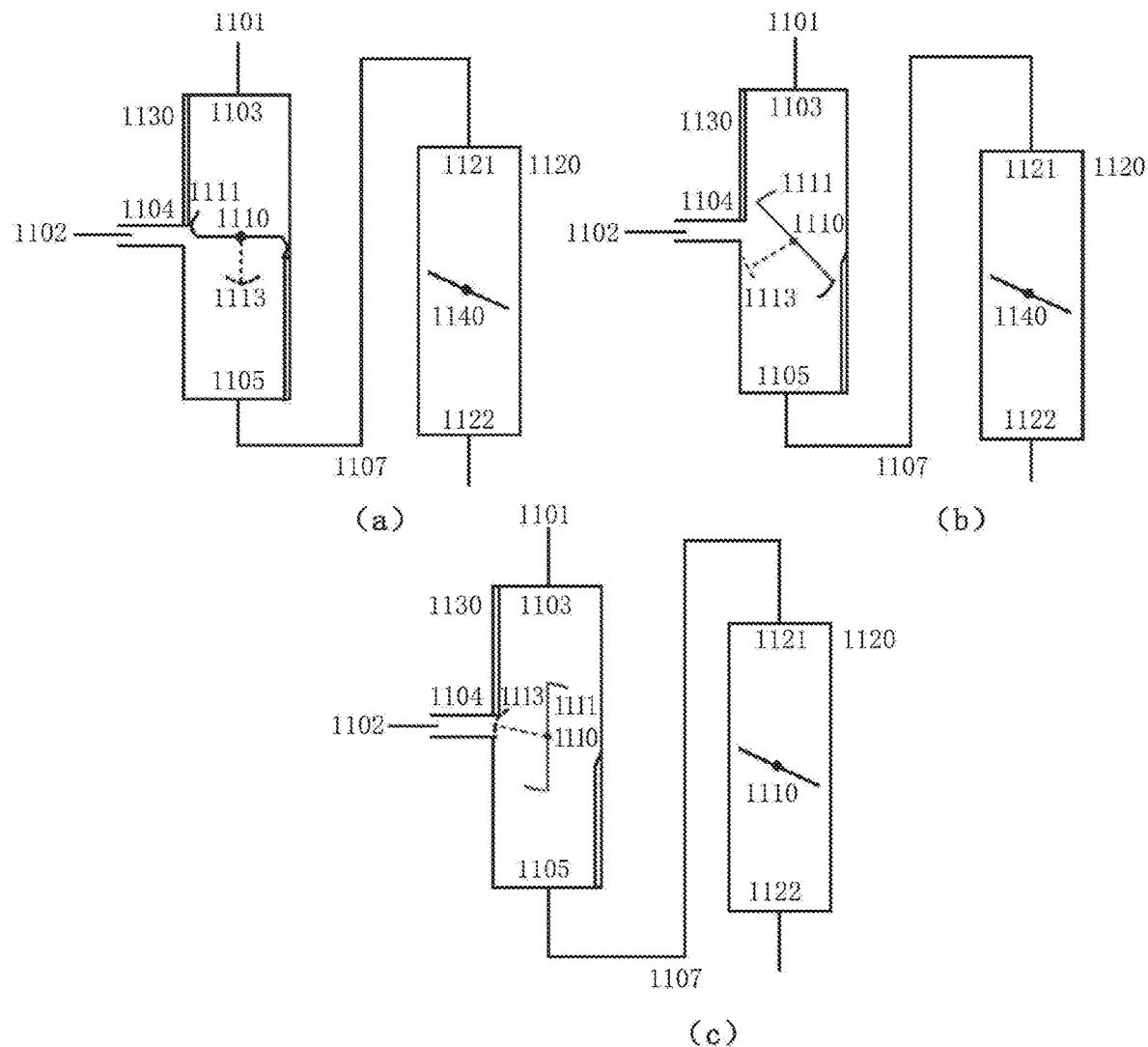
FIG. 11 is a view illustrating working states of a temperature control throttle device according to another embodiment of the present disclosure.

FIG. 11 is a view illustrating working states of a temperature control throttle device according to another embodiment of the present disclosure.

Referring to FIG. 11, the temperature control throttle device may include a first throttle 1130 and a second throttle 1120 connected in series. The first pipeline (conventional pipeline) 1101 and the second pipeline (heating pipeline) 1102 are connected to the same side of the first throttle 1130 in the air flow direction in parallel (at the upstream of the first throttle 1130 as shown in FIG. 11), and the second pipeline 1102 is provided with a heat exchanger (not shown). The first throttle 1130 has a first inlet 1103 connected to the first pipeline 1101, a second inlet 1104 connected to the second pipeline 1102 and an outlet 1105. The second throttle 1120 is located downstream of the first throttle 1130 and have an inlet 1121 connected to the outlet 1105 of the first throttle 1130 through an intermediate pipeline 1107 and an outlet 1122 connected to the engine air-intake manifold.

The first throttle 1130 selectively receives air flowing through the first pipeline 1101 or the second pipeline 1102. Specifically speaking, two ends of a valve body 1110 of the first throttle 1130 are provided with a first blocking member (also referred to as the first valve body fin) 1111 and a second blocking member, respectively. Alternatively, the valve body 1110 may further be provided with an optional extended member connected to the valve body and extending in a direction at a predetermined angle to the valve body (e.g., a direction perpendicular to the valve body, but not limited thereto) and an optional third blocking member (also referred to as the second valve body fin) 1113 disposed at an end of the extended member.

As shown in (a) of FIG. 11, when the engine is not working, the valve body 1110 of the first throttle 1130 is in a horizontal state, the first blocking member 1111 and the second blocking member form sealing with two side walls of the first throttle 1130, thereby preventing air from passing through the first throttle 1130. Meanwhile, the first blocking member 1111 also blocks the second inlet 1104. After the engine starts to work, the valve body 1110 starts to rotate. As the valve body 1110 rotates, the blocking degree of the first blocking member 1111 to the second inlet 1104 gradually decreases, heated intake air starts to enter the first throttle 1130 through the opened second inlet 1104, enters the intermediate pipeline 1107 through the outlet 1105, and then enters the second throttle 1120 through the inlet 1121 of the second throttle 1120. Thereafter, as shown in (b) of FIG. 11, as the valve body 1110 continues to rotate beyond a first predetermined position, the sealing between the first blocking member 1111 and the second blocking member and the two side walls of the first throttle 1130 is released, unheated intake air may enter the first throttle 1130 through the first inlet 1103, and the intake air temperature of the first throttle 1130 starts to decrease. Accordingly, the intake air temperature of the second throttle 1120 may also decrease. Thereafter, as the valve body 1110 continues to rotate, more and more unheated intake air enters the first throttle 1130 through the first inlet 1103. In particular, since the cross-sectional area of the first inlet 1103 is far bigger than that of the second inlet 1104, the ratio of the unheated intake air in the intake air discharged to the second throttle 1120 through the outlet 1105 becomes higher and higher. As shown in (c) of FIG. 11, as the valve body 1110 continues to rotate beyond the second predetermined position (e.g., when the valve body 1110 rotates 90 degrees), unheated intake air passes through the outlet 1105 without any blocking. At this time, the ratio of heated intake air in the intake air passing through the outlet 1105 may be negligible. Alternatively, when the valve body 1110 rotates beyond the second predetermined position, the third blocking member 1113 may block the second inlet 1104, the heated intake air does not enter the first throttle 1130 through the second inlet 1104 so as to ensure that the engine intake air temperature is the same as that in the conventional state, and there will be no extra knocking burden.

According to the present embodiment, when the first inlet 1103 and/or second inlet 1104 are/is opened so that the intake air enters the second throttle 1120 through the intermediate pipeline 1107, the flow amount of the air discharged from the outlet 1122 may be controlled by adjusting the rotation degree of the valve body 1140 of the second throttle 1120, thereby realizing the control of the air flow amount entering the engine.

In the present embodiment, the first throttle 1130 is used to control the ratio between the heated air and the unheated air, and thus any valve body that may realize the above purpose is applicable to the first throttle 1130. On the other hand, the second throttle 1120 is used to control the air flow amount entering the engine, which may be implemented by a conventional throttle. Alternatively, the second throttle 1120 may also be located upstream of the first throttle 1130.

On the other hand, if the first throttle may have a structure as shown in FIG. 3B, the second throttle may include a first inlet connected to the first pipeline, a second inlet connected to the second pipeline, and an outlet connected to the engine air-intake manifold. The first throttle may be used to selectively make air flow through the first pipeline or the second pipeline, and the second throttle may be used to control the air flow amount entering the engine. Similarly, the second throttle may also be located upstream of the first throttle.

Alternatively, the second throttle may be located upstream of the first throttle and used to control the air flow amount entering the first pipeline and the second pipeline when the first pipeline and the second pipeline are located upstream of the first throttle, or used to control the air flow amount entering the first throttle when the first pipeline and the second pipeline are located downstream of the first throttle.

Figure 12:
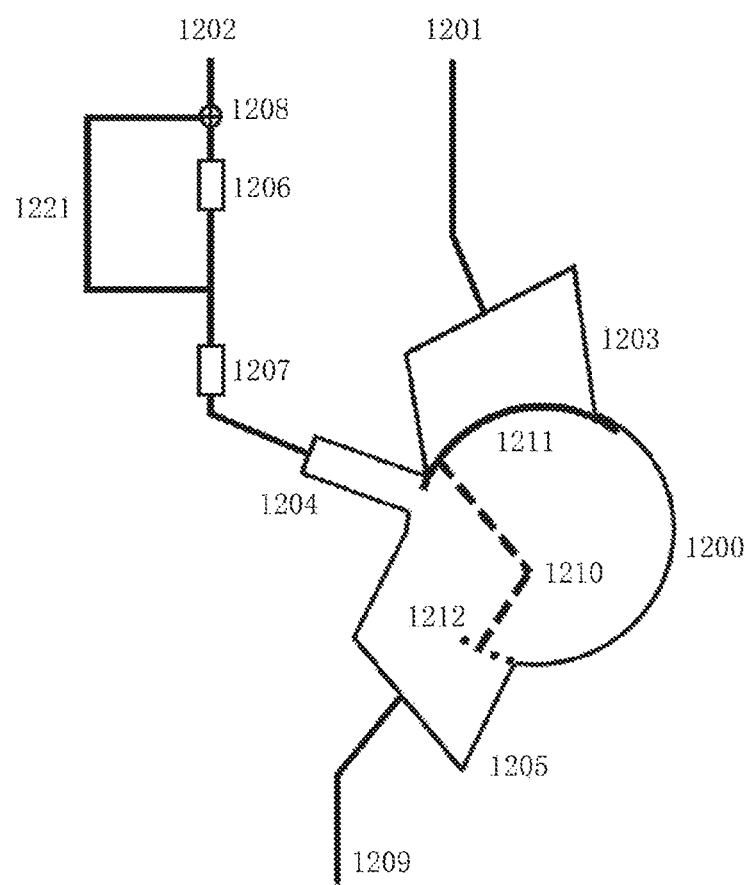
FIG. 12 is a view illustrating a temperature control throttle device according to another embodiment of the present disclosure.

FIG. 12 is a view illustrating a temperature control throttle device according to another embodiment of the present disclosure.

The structure of the temperature control throttle shown in FIG. 12 is substantially the same as the structure of the temperature control throttle shown in FIG. 3A. Specifically speaking, referring to FIG. 12, the temperature control throttle device includes a throttle 1200, a first pipeline 1201 and a second pipeline 1202, wherein the first pipeline 1201 and the second pipeline 1202 are connected to the same side of the throttle 1200 in the air flow direction in parallel. For example, the first pipeline 1201 and the second pipeline 1202 may be located upstream of the throttle 1200 in parallel. The second pipeline 1202 is provided with a heat exchanger including a first heat exchanger 1206 and a second heat exchanger 1207 connected in series. Here, the heat source of the first heat exchanger 1206 may be the engine exhaust gas, and the heat source of the second heat exchanger 1207 may be the engine coolant. The throttle 1200 further has a first inlet 1203 connected to the first pipeline 1201, a second inlet 1204 connected to the second pipeline 1202, and an outlet 1205 connected to the engine air-intake manifold 1209. The first inlet 1203 and the second inlet 1204 may be arranged physically adjacent to each other, and match with a valve body 1210 of the throttle 1200 in a planar surface or in a curved surface (in the present embodiment, they match in the curved surface). As the valve body 1210 performs a motion in the planar surface or in the curved surface (in the preset embodiment, the motion is in the curved surface), the second inlet 1204 is first opened, and as the valve body 1210 continues to perform the motion in the planar surface or in the curved surface (in the present embodiment, the motion is in the curved surface) beyond a first predetermined position, the first inlet 1203 is opened.

The second pipeline 1202 is further provided with a control valve 1208 and a bypass pipeline 1221. The control valve 1208 is disposed upstream of the first heat exchanger 1206, and one end of the bypass pipeline 1221 is connected to the control valve 1208 and the other end thereof is connected to the downstream of the first heat exchanger 1206. For example, the other end of the bypass pipeline may be connected between the first heat exchanger and the second heat exchanger. When the control valve 1208 is closed, the bypass pipeline 1221 is disabled, so that the first heat exchanger 1206 is enabled. Meanwhile, the second heat exchanger 1207 is enabled. When the control valve 1208 is opened, the bypass pipeline 1221 is enabled, so that the first heat exchanger 1206 is disabled, and only the second heat exchanger 1207 is enabled. However, the present disclosure is not limited to this. For example, when the control valve 1208 is opened, the bypass pipeline 1221 may be disabled, so that the first heat exchanger 1206 is enabled. Meanwhile, the second heat exchanger 1207 is also enabled. When the control valve 1208 is closed, the bypass pipeline 1221 may be enabled, so that the first heat exchanger 1206 is disabled, and only the second heat exchanger 1207 is enabled. In this way, through the actuation of the control valve 1208, the thermal boundary of the second pipeline 1202 may be remarkably changed. By providing the first heat exchanger 1206, when the temperature of the engine is relative low (e.g., when the engine performs a cold start) or when the heat generated by the engine is not sufficient (e.g., in an condition of low load and high cold), the air flowing through the second pipeline 1202 can be heated using all the heat sources of the engine as much as possible. Meanwhile, the air flowing through the first heat exchanger 1206 may also flow through the second heat exchanger 1207. In this way, it can ensure that the temperature of the air finally entering the engine is always near the temperature of the engine coolant, preventing abnormal combustion caused by the intake air of excessively high temperature entering the engine.

In addition, the valve body 1210 of the throttle 1200 has a first blocking member 1211 and a second blocking member 1212, and they may be in a close contact with the side wall of the throttle 1200, thereby forming sealing with the side wall of the throttle 1200. Since the working principle of the throttle 1200 shown in FIG. 12 is the same as that of the throttle 330 shown in FIG. 3A, and the temperature control throttle shown in FIG. 12 may have the working states of the temperature control throttle shown in FIG. 10, the description thereof is not repeatedly described here.

Figure 13:
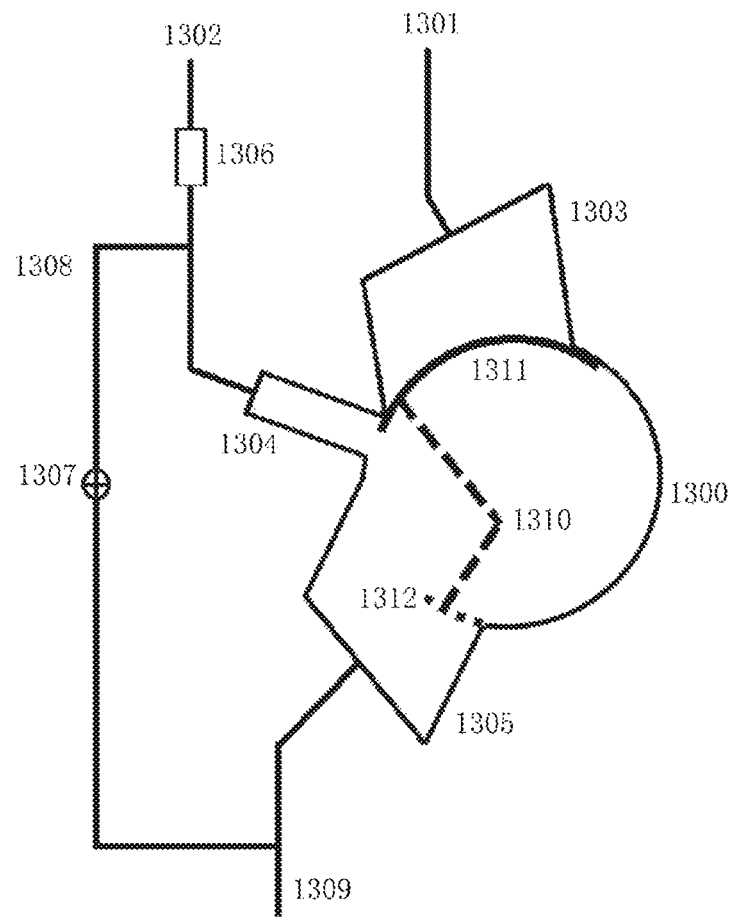
FIG. 13 is a view illustrating a temperature control throttle device according to another embodiment of the present disclosure.

FIG. 13 is a view illustrating a temperature control throttle device according to another embodiment of the present disclosure.

The structure of the temperature control throttle shown in FIG. 13 is substantially the same as that of the temperature control throttle shown in FIG. 3A. Specifically speaking, referring to FIG. 13, the temperature control throttle device includes a throttle 1300, a first pipeline 1301 and a second pipeline 1302, wherein the first pipeline 1301 and the second pipeline 1302 are connected to the same side of the throttle 1300 in the air flow direction in parallel. For example, the first pipeline 1301 and the second pipeline 1302 may be located upstream of the throttle 1300 in parallel. The second pipeline 1302 is provided with a heat exchanger 1306. The heat source of the heat exchanger 1306 may be the engine coolant. Alternatively, the heat source of the heat exchanger 1306 may also be both of the engine exhaust gas and the engine coolant, and the heat source of the heat exchanger 1306 may be switched between the engine exhaust gas and the engine coolant, thereby only one of the engine exhaust gas and the engine coolant being used as the heat source. The throttle 1300 further has a first inlet 1303 connected to the first pipeline 1301, a second inlet 1304 connected to the second pipeline 1302, and an outlet 1305 connected to the engine air-intake manifold 1309. The first inlet 1303 and the second inlet 1304 may be arranged physically adjacent to each other, and match with a valve body 1310 of the throttle 1300 in a planar or curved surface (in the present embodiment, they match in the curved surface). As the valve body 1310 performs a motion in the planar surface or in the curved surface (in the preset embodiment, the motion is in the curved surface), the second inlet 1304 is first opened, and as the valve body 1310 continues to perform the motion in the planar or curved surface (in the preset embodiment, the motion is in the curved surface) beyond a first predetermined position, the first inlet 1303 is opened.

The temperature control throttle device further includes a third pipeline 1308 and an air valve 1307 disposed in the third pipeline 1308. One end of the third pipeline 1308 is connected between the heat exchanger 1306 and the second inlet 1304, and the other end of the third pipeline 1308 is connected to the downstream of the outlet 1305. When the air valve 1307 is closed, the third pipeline 1308 is disabled, and when the air valve 1307 is opened, the third pipeline 1308 is enabled. Obviously, when the third pipeline 1308 is disabled, the temperature control throttle shown in FIG. 13 is completely the same as the temperature control throttle shown in FIG. 3A. In FIG. 3A, the minimum flow resistance in the second pipeline 302 is determined by the cross-sectional area of the inlet 304 of the throttle 330. However, in FIG. 13, the cross-sectional area of the inlet formed by the other end of the third pipeline 1308 at the downstream of the outlet 1305 is bigger than that of the second inlet 1304. In this way, when the air valve 1307 is fully opened, while the first inlet 1303 is fully closed (the second inlet 1304 may be of any opened degree), intake air of the engine has barely any resistance. Meanwhile, all of the intake air is heated by the heat exchanger 1306. As a result, the engine can work in a Homogeneous Charge Compression Ignition (HCCI) state. Specifically speaking, when the engine is working in the HCCI state, it is expected that the HCCI state can be expanded to a state of low load as much as possible. One factor that hinders the HCCI state expanding to the state of low load is the intake air temperature. The engine needs to work in various environments, e.g., in an environment of high cold, where the temperature may be as low as minus 40 to 50° C.; while under an extremely hot condition, the temperature may exceed 50° C., and the difference of intake air temperature between the two conditions is huge, which brings great difficulty to the control and application of HCCI. By the temperature control throttle device as shown in FIG. 13, the intake air having a temperature close to that of the engine coolant can be obtained all the time, and a switching between the HCCI and the conventional engine working states can be quickly switched by the air valve 1307. Thus, as for the engine, the thermal boundary, pressure boundary and response speed of the control may be simultaneously ensured.

In addition, the valve body 1310 of the throttle 1300 has a first blocking member 1311 and a second blocking member 1312, and they may be in a close contact with the side wall of the throttle 1300, thereby forming sealing with the side wall of the throttle 1300. Since the working principle of the throttle 1300 shown in FIG. 13 is the same as that of the throttle 330 shown in FIG. 3A, and the temperature control throttle shown in FIG. 13 may have the same working states of the temperature control throttle shown in FIG. 7, the description thereof is not repeatedly described here.

Alternatively, when the temperature control throttle device has a structure as shown in FIG. 3B, one end of the third pipeline may be connected to the upstream of the inlet 1302, and the other end of the third pipeline may be connected between the heat exchanger 1309 and the second outlet 1305. When the air valve disposed in the third pipeline is closed, the third pipeline is disabled, and when the air valve is opened, the third pipeline is enabled.

With the temperature control throttle device according to the embodiments of the present disclosure, temperature control of the engine may be realized; intake air heating may be provided when the engine load is low, pumping loss of the engine may be reduced and the oil and gas mixing may be improved, thereby improving oil consumption and reducing emissions; and meanwhile, when the engine is fully loaded, the original intake air temperature may be maintained to ensure that the engine's full load combustion characteristic and performance are not affected. In addition, since temperature control is realized by directly controlling the air, there is almost no delay in temperature change, thermal inertia does not exist, and complexity of control is reduced.

Although some exemplary embodiments have been shown and described, it should be understood by those skilled in the art that the amendments may be made to those embodiments without departing from the spirit and scope of the present disclosure, the scope of the present disclosure is defined by the claims and the equivalents thereof.

What is claimed is:

1. A temperature control throttle device comprising:
a first throttle including a valve body; and
a first pipeline and a second pipeline,
wherein the first pipeline and the second pipeline are connected in parallel to a same side of the first throttle with respect to an air flow direction, and
wherein the second pipeline is provided with a heat exchanger for heating air flowing through the second pipeline with engine coolant, engine oil or engine exhaust gas as a heat source,
wherein the first pipeline and the second pipeline are located upstream of the first throttle, and the first throttle has a first inlet connected to the first pipeline, a second inlet connected to the second pipeline, and an outlet connected to an engine air-intake manifold;
or, the first pipeline and the second pipeline are located downstream of the first throttle and are both connected to an engine air-intake manifold, and the first throttle has an air intake inlet, a first outlet connected to the first pipeline, and a second outlet connected to the second pipeline, wherein the valve body comprises a first blocking member and a second blocking member provided at two ends thereof, respectively, wherein when the valve body is in a closed state, the valve body forms a sealing with two inner walls of the first throttle to prevent air from passing through the first throttle, and the first blocking member blocks the second inlet or the second outlet, respectively, wherein, as the valve body performs a motion on an inner surface of the first throttle, a blocking degree of the first blocking member to the second inlet or the second outlet, respectively, gradually decreases, and when the valve body moves to a predetermined threshold position, the sealing between the valve body and the two inner walls of the first throttle is released, wherein the first inlet and the second inlet are arranged physically adjacent to each other and match with the valve body of the first throttle, or, the first outlet and the second outlet are arranged physically adjacent to each other and match with the valve body.

2. The temperature control throttle device of claim 1, wherein the second pipeline is provided with a slider configured to control an effective intake air area of the second pipeline for changing a flow resistance characteristic.

3. The temperature control throttle device of claim 1, wherein the valve body further comprises: an extended member extending from a center of the valve body in a direction at a predetermined angle to the valve body, and a third blocking member disposed at an end of the extended member.

4. The temperature control throttle device of claim 1, wherein as the valve body performs the motion on the inner surface of the first throttle, the second inlet is first opened, and as the valve body continues to perform the motion beyond a first predetermined position, the first inlet is opened;

or, as the valve body performs the motion on the inner surface of the throttle, the second outlet is first opened, and as the valve body continues to perform the motion beyond a first predetermined position, the first outlet is opened.

5. The temperature control throttle device of claim 4, wherein the valve body is provided with an optional blocking member thereon, wherein, as the valve body continues to perform the motion from the first predetermined position beyond a second predetermined position, the optional blocking member blocks the second inlet;

or, as the valve body continues to perform the motion from the first predetermined position beyond a second predetermined position, the optional blocking member blocks the second outlet.

6. The temperature control throttle device of claim 1, wherein the temperature control throttle device further comprises a second throttle, wherein the second throttle is connected in series to the first throttle and is located upstream or downstream of the first throttle.

7. The temperature control throttle device of claim 1, wherein the heat exchanger comprises a first heat exchanger and a second heat exchanger connected in series, wherein the heat source of the first heat exchanger is engine exhaust gas and the heat source of the second heat exchanger is engine coolant, wherein, the second pipeline is further provided with a control valve and a bypass pipeline, wherein the control valve is disposed upstream of the first heat exchanger, one end of the bypass pipeline is connected to the control valve and an other end of the bypass pipeline is connected to downstream of the first heat exchanger, wherein, when the control valve is closed, the first heat exchanger is enabled and the bypass pipeline is disabled, and when the control valve is opened, the bypass pipeline is enabled and the first heat exchanger is disabled;

or, when the control valve is opened, the first heat exchanger is enabled and the bypass pipeline is disabled, and when the control valve is closed, the bypass pipeline is enabled and the first heat exchanger is disabled.

8. The temperature control throttle device of claim 1, further comprising:

a third pipeline and an air valve disposed therein, wherein one end of the third pipeline is connected between the heat exchanger and the second inlet, and an other end of the third pipeline is connected to downstream of the outlet, wherein, when the air valve is closed, the third pipeline is disabled, and when the air valve is opened, the third pipeline is enabled;

or, a third pipeline and an air valve disposed therein, wherein, one end of the third pipeline is connected to upstream of the inlet, and an other end of the third pipeline is connected between the heat exchanger and the second outlet, wherein, when the air valve is closed, the third pipeline is disabled, and when the air valve is opened, the third pipeline is enabled.

* * * * *